Oct. 5, 1971   K. F. VORNBERGER   3,609,785
HEEL LASTING MACHINE

Filed May 28, 1970   19 Sheets-Sheet 1

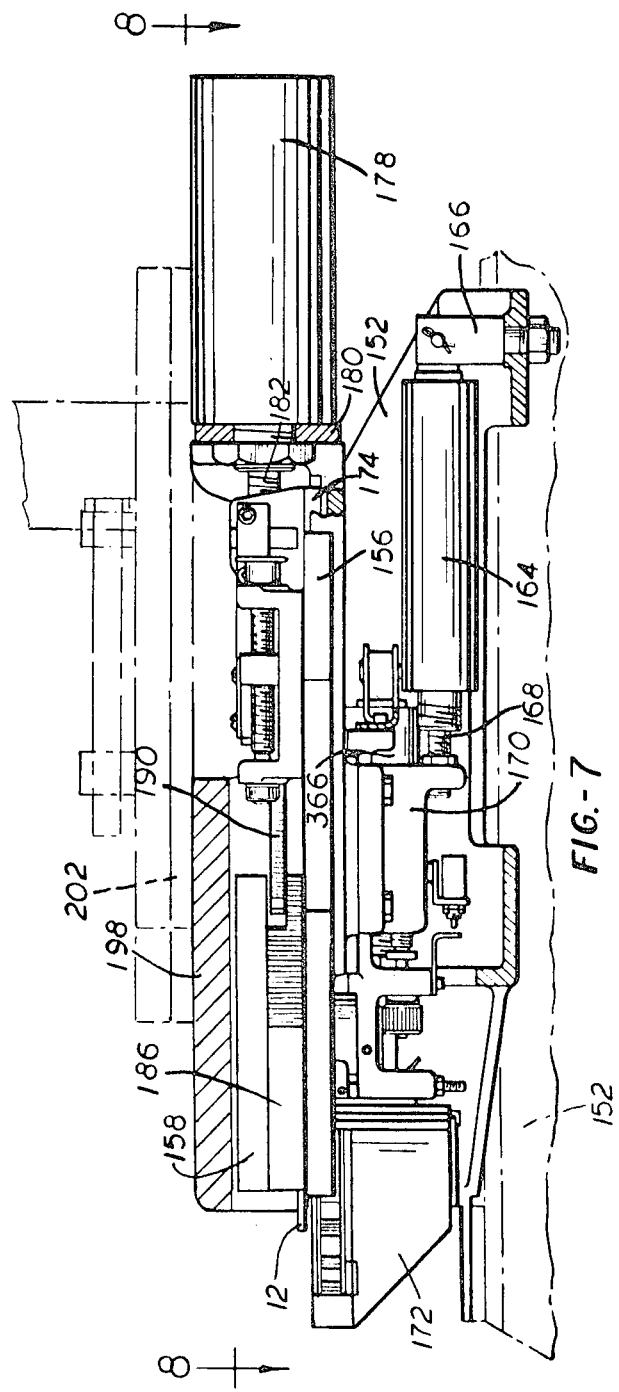

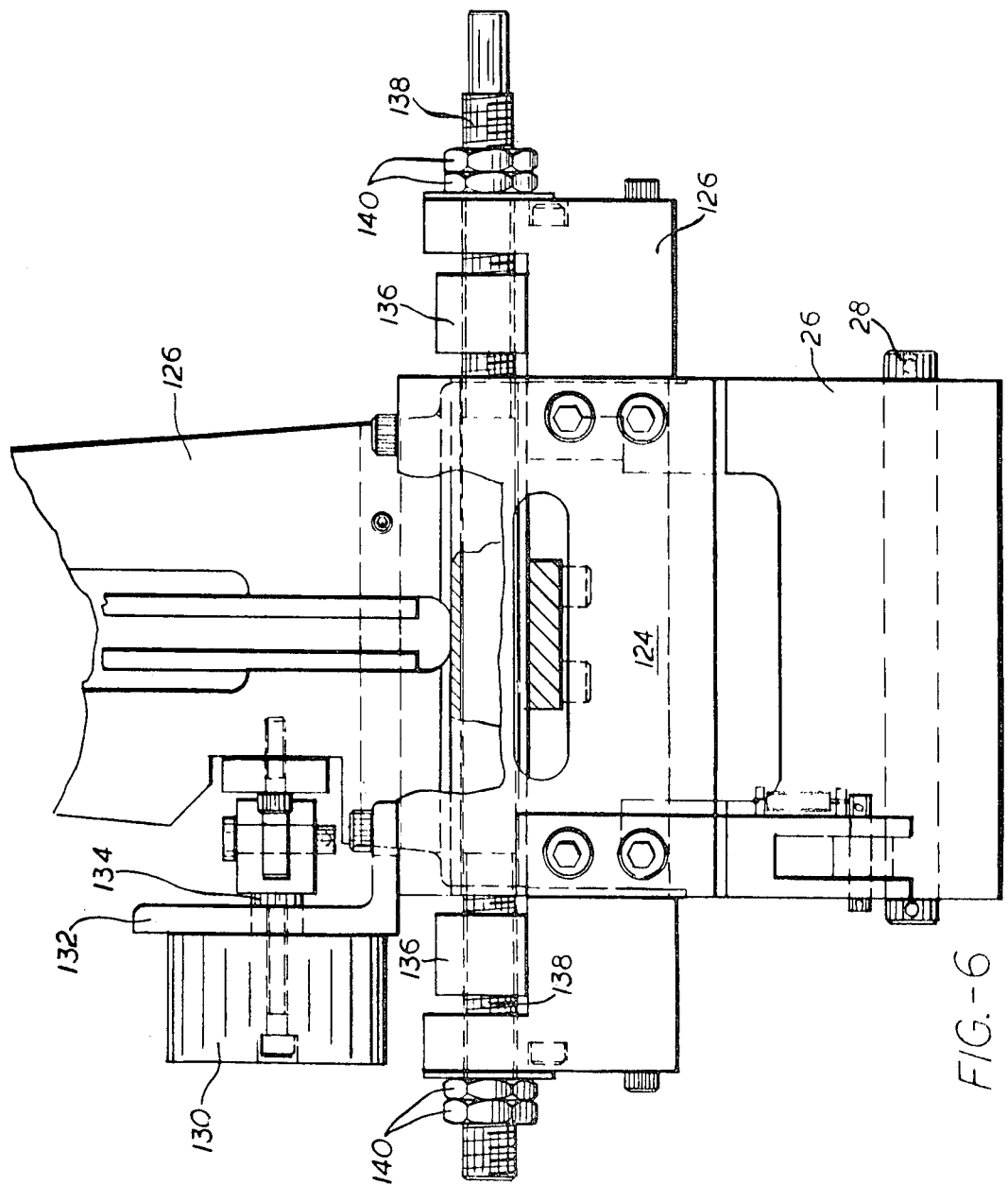

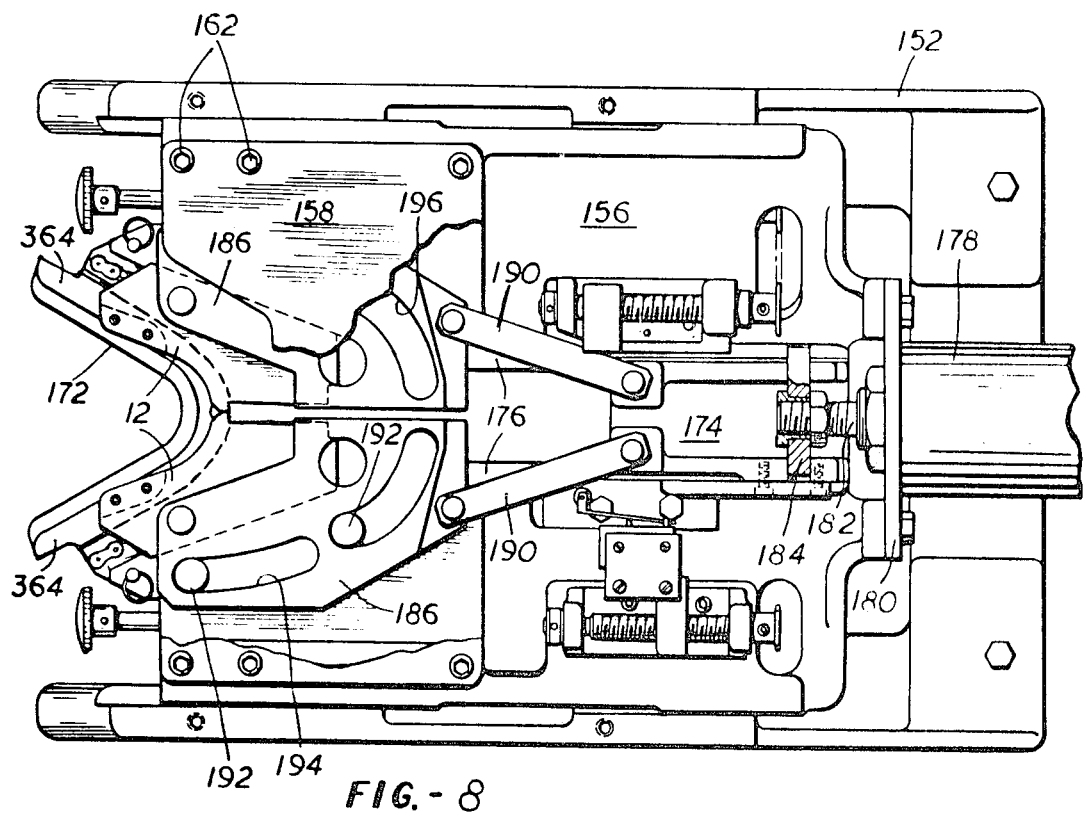

Oct. 5, 1971                K. F. VORNBERGER                3,609,785
                            HEEL LASTING MACHINE
Filed May 28, 1970                                    19 Sheets-Sheet 9
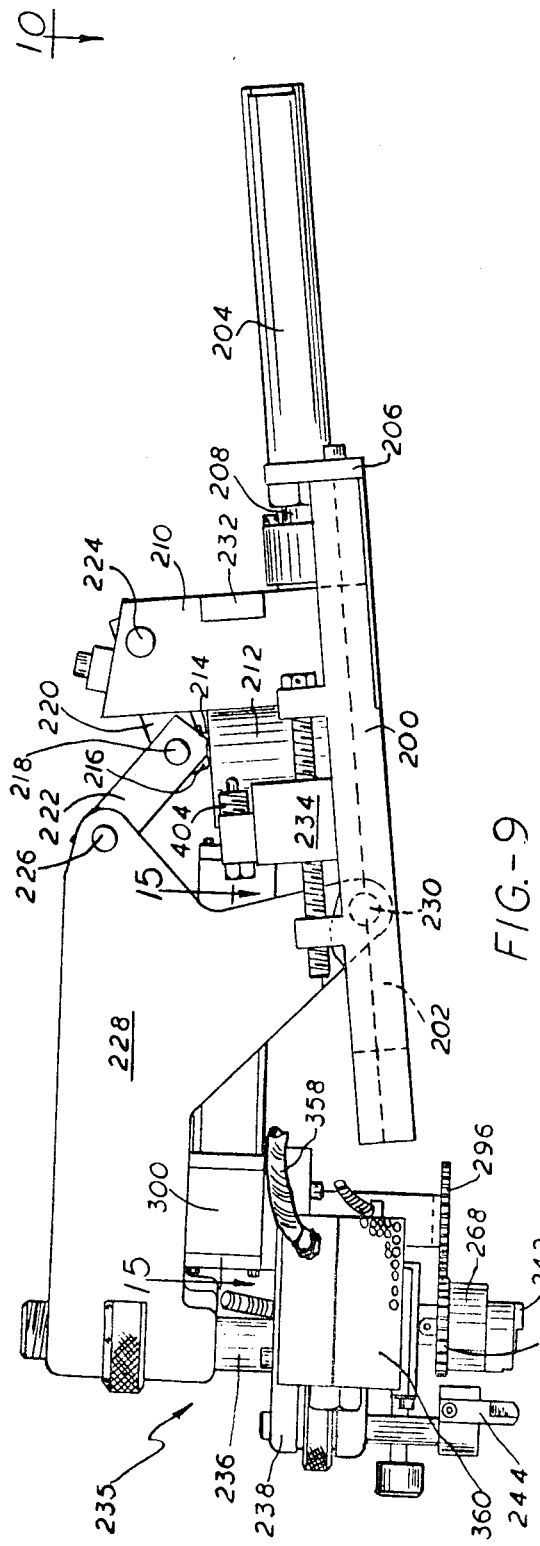
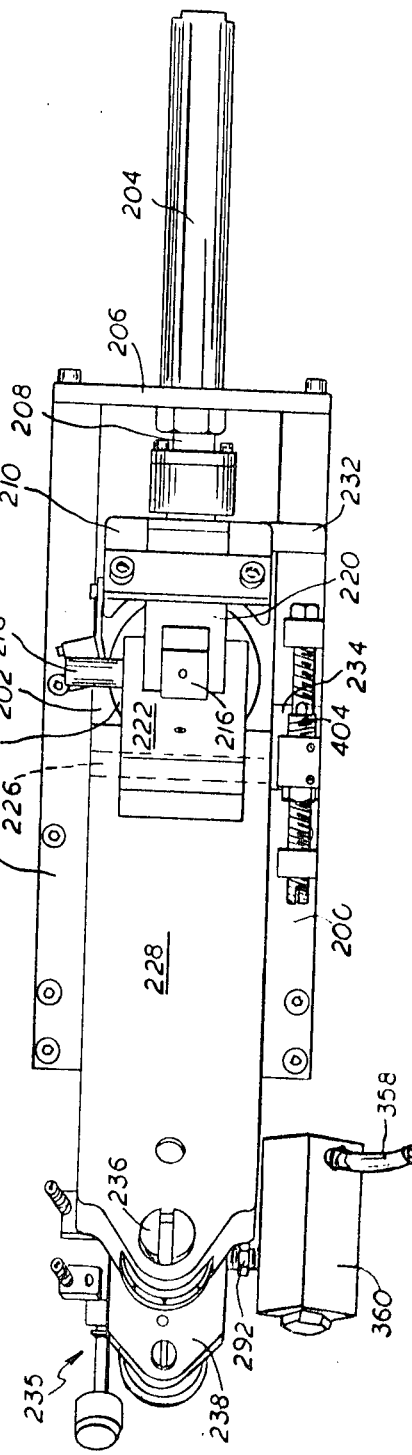

Oct. 5, 1971           K. F. VORNBERGER           3,609,785

HEEL LASTING MACHINE

Filed May 28, 1970

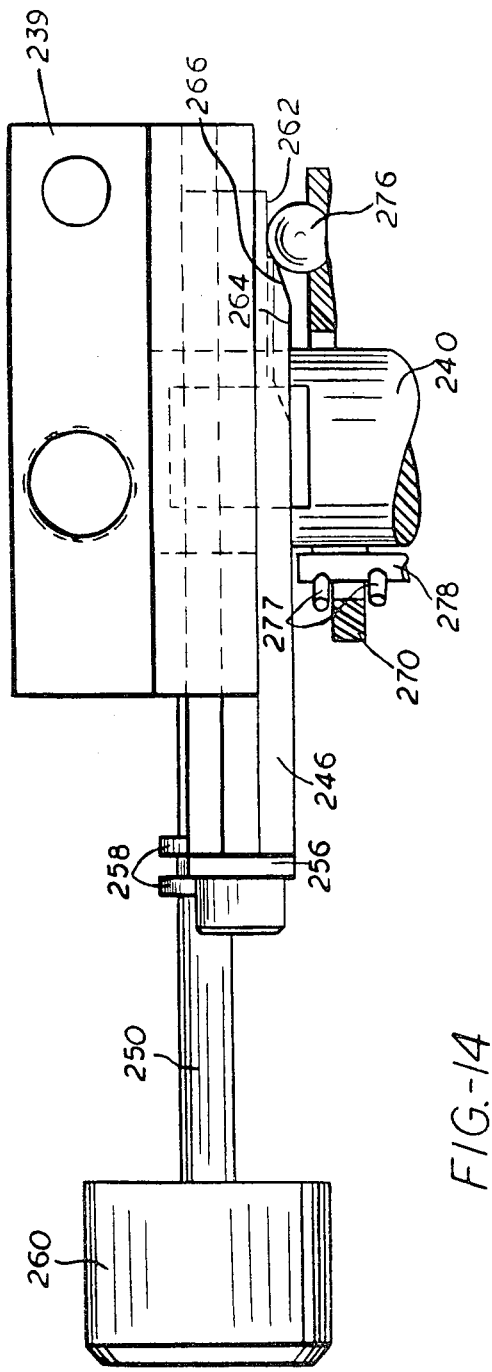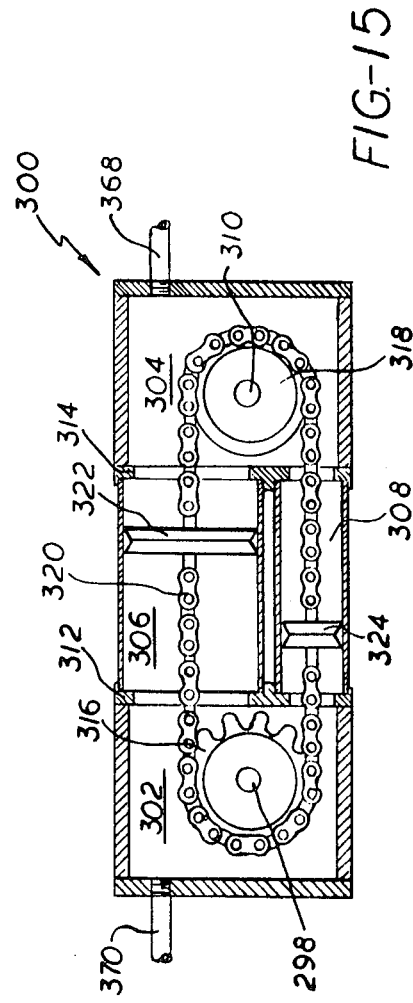

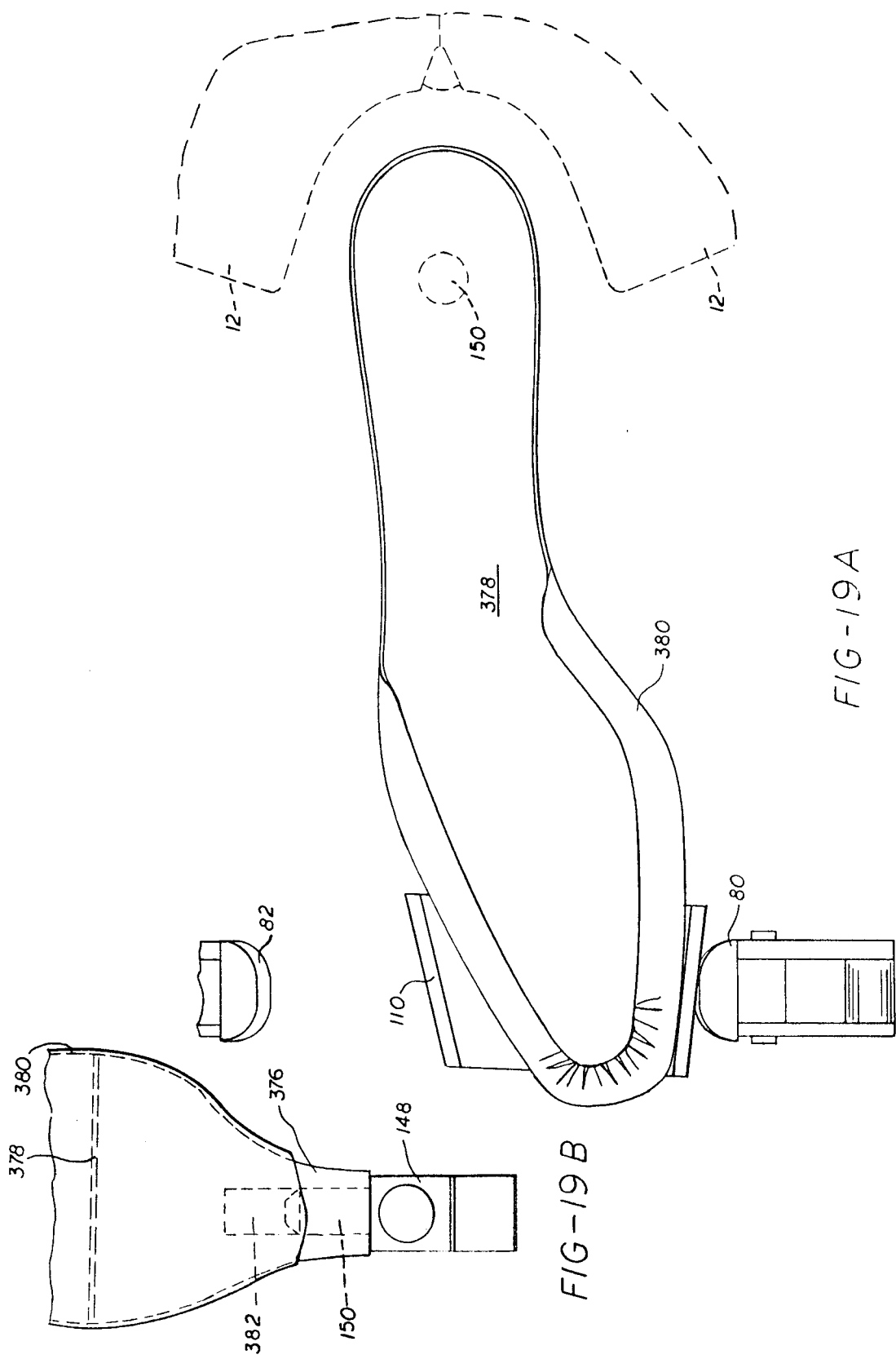

United States Patent Office 3,609,785
Patented Oct. 5, 1971

3,609,785
HEEL LASTING MACHINE
Karl F. Vornberger, Tewksbury, Mass., assignor to
Jacob S. Kamborian, West Newton, Mass.
Filed May 28, 1970, Ser. No. 41,500
Int. Cl. A43d 21/00
U.S. Cl. 12—12.5
23 Claims

ABSTRACT OF THE DISCLOSURE

A heel lasting machine having a laterally shiftable last support for bringing the heel of a shoe assembly into proper relationship with respect to heel wipers, a toe rest that is movable into engagement with the vamp of the shoe assembly after the shoe assembly has been clamped between the last support and a hold-down at a level suitable for heel wiping, and a cement spraying nozzle that is swingable through an adjustable arc to spray cement into the angle between the heel portion of an upper margin and an insole prior to wiping the upper margin against the insole.

---

In a heel lasting operation, wherein the heel portion of the margin of an upper is wiped against an insole by symmetrically disposed wiping means, it is desirable that the heel portion of a shoe assembly, that comprises a last having the insole on its bottom and the upper mounted thereon, have its line of symmetry coincide with the line of symmetry of the wiping means. One aspect of the invention relates to a machine for effecting this coincidence. The machine comprises a support on which the shoe assembly is supported for lateral swinging movement and a pair of sensing mechanisms so located that a lateral swinging of a shoe assembly to a position that causes actuation of a selected sensing mechanism acts to urge the support laterally to a position wherein the desired coincidence takes place.

It is conventional in a heel lasting operation to clamp the shoe assembly bottom-up between a last support and a holddown at a level suitable for wiping and to support the vamp of the shoe assembly at this level by a toe rest. The last support, hold-down and toe rest cooperate to restrain the shoe assembly from movement during the heel wiping operation. A second aspect of the invention relates to an arrangement for bringing the toe rest into engagement with the vamp, after the shoe assembly has been clamped between the last support and the hold-down, regardless of the heightwise dimension of the vamp. This is accomplished by incorporating in the machine a control for raising the toe rest into engagement with the vamp under a yieldable force after the shoe assembly has been clamped between the last support and the hold-down.

In the drawings:

FIG. 6 is a view taken on the line 6—6 of FIG. 3;

FIG. 7 is a side elevation of a heel wiper operating mechanism;

FIG. 8 is a plan view taken on the line 8—8 of FIG. 7;

FIG. 9 is a side elevation of an applicator-hold-down unit;

FIG. 10 is a plan view taken on the line 10—10 of FIG. 9;

FIG. 14 is a view taken on the line 14—14 of FIG. 12;

FIG. 15 is a section of a motor for swinging the nozzle taken on the line 15—15 of FIG. 9;

FIG. 19A is a view taken on the line 19A—19A of FIG. 19;

FIG. 19B is a view taken on the line 19B—19B of FIG. 19;

Figure 1:
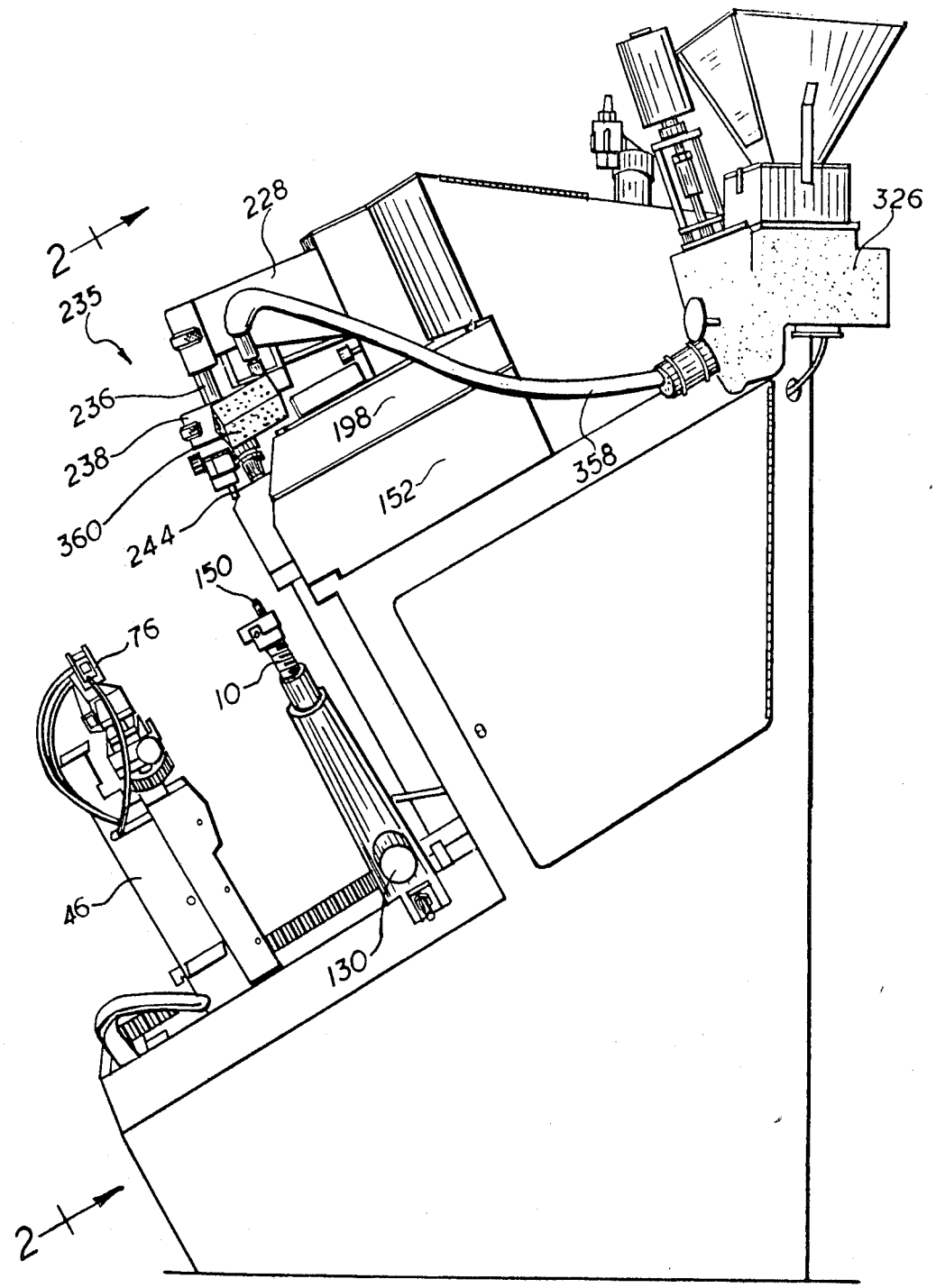
FIG. 1 is a side elevation of the machine.
Figure 2:
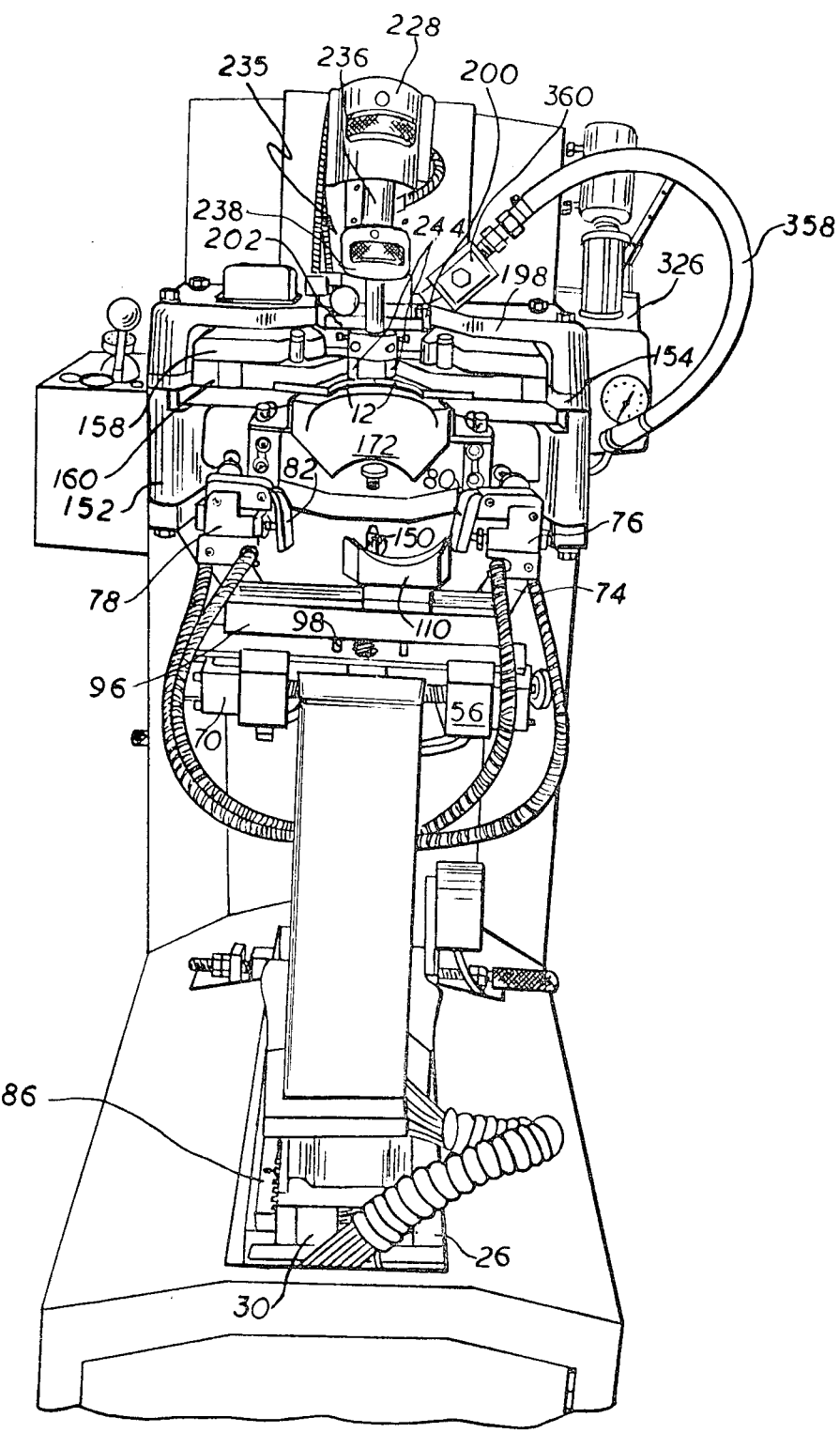
FIG. 2 is a front elevation of the machine taken on the line 2—2 of FIG. 1.

Referring to FIGS. 1 and 2, the machine includes a shoe assembly supporting mount 10 and heel wipers 12. The machine is inclined so that the plane in which the wipers lie is inclined from the horizontal and the longitudinal axis of the mount 10 is inclined from the vertical to facilitate accessibility of the machine to the operator. For ease of explanation, the plane in which the wipers 12 lie will be considered to be horizontal and the longitudinal axis of the mount 10 will be considered to be vertical. In operating the machine, the operator stands to the left of the machine as seen in FIG. 1, and directions that extend toward the operator will be described as forward while directions that extend away from the operator will be described as rearward.

Referring to FIGS. 1–4, the machine frame includes a base 14 to the lower end of which is secured an air operated motor 16. the piston rod 18 of the motor 16 is connected to a vertically extending post 20 that is slidably guided in the base 14. A key 22, secured to the base 14, is received in a slot 24 in the post 20 to preclude the post from movement about its vertical axis. The upper end of the post 20 is received in a recess in a platform 26 and is secured to the platform by a pin 28. A base 30 is slidably mounted on the platform 26 for forward-rearward movement. A screw 32, rotatably mounted in the platform 26, is threadly received in a hanger 34 that depends from the base 30. The screw is connected to a sprocket 36 that is rotatable in a flange 38 that is secured to the front of the platform 26. A sprocket 40, also rotatably mounted in the flange 38, is connected to the sprocket 36 by a chain 42. The sprocket 40 is connected to a reversible electric motor 44 that is also mounted to the flange 38. Thus it can be seen that the base 30 and the parts carried thereby may be adjusted forwardly and rearwardly in the platform 26 by the motor 44.

Figure 3:
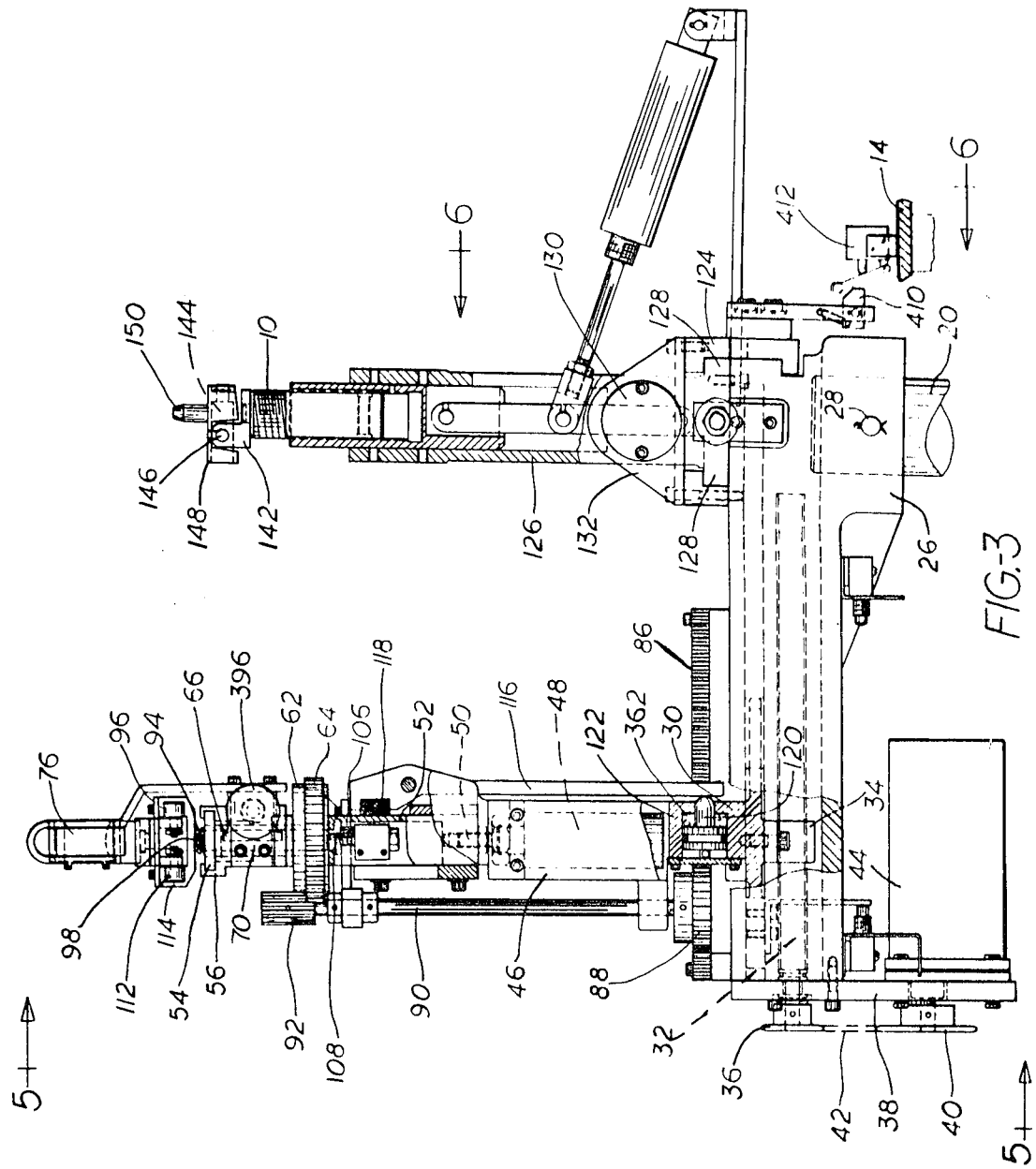
FIG. 3 is a side elevation of a platform that mounts the last support and the toe rest.
Figure 4:
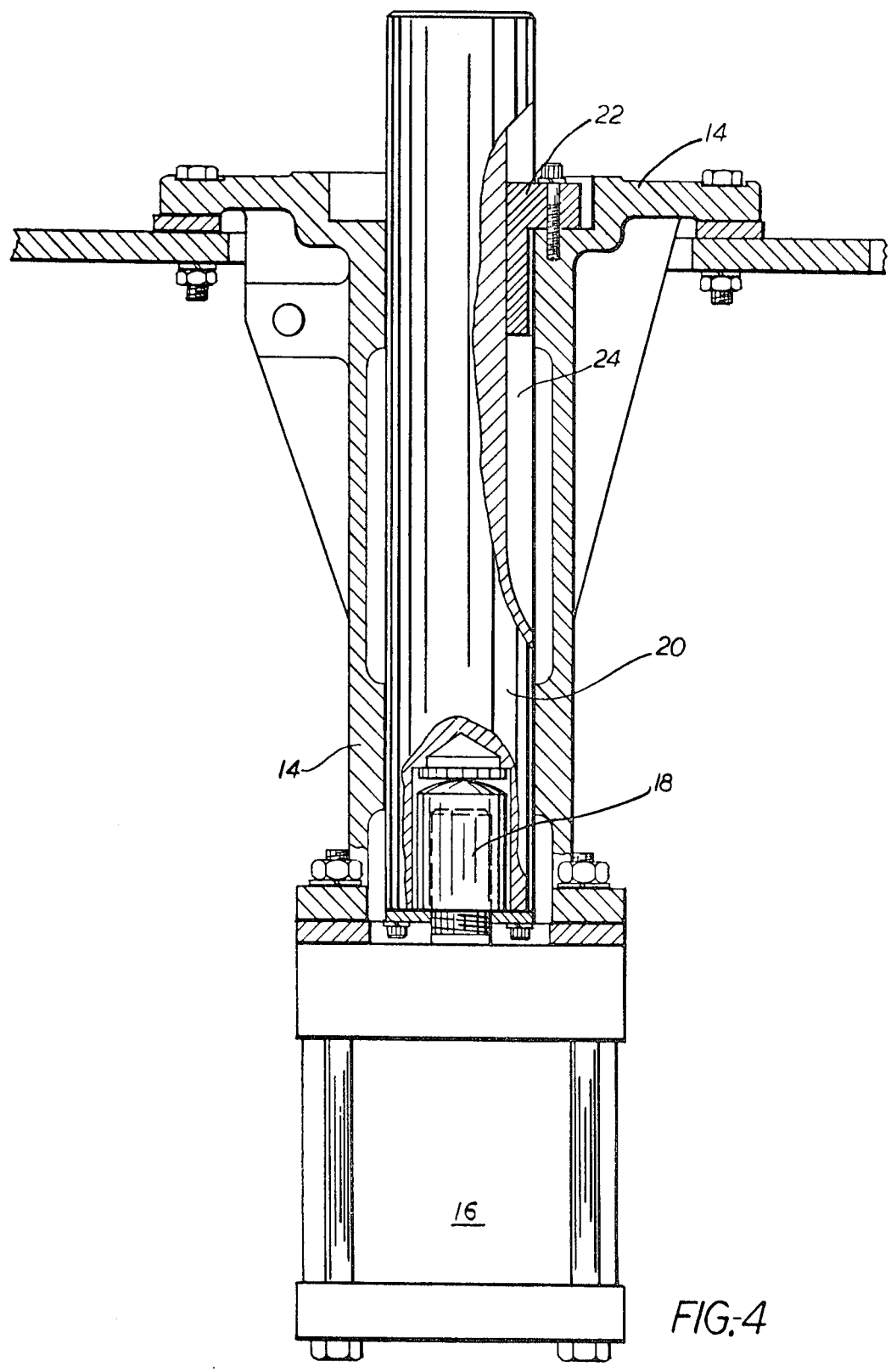
FIG. 4 is an elevation of a post that supports the platform for heightwise movement.
Figure 5:
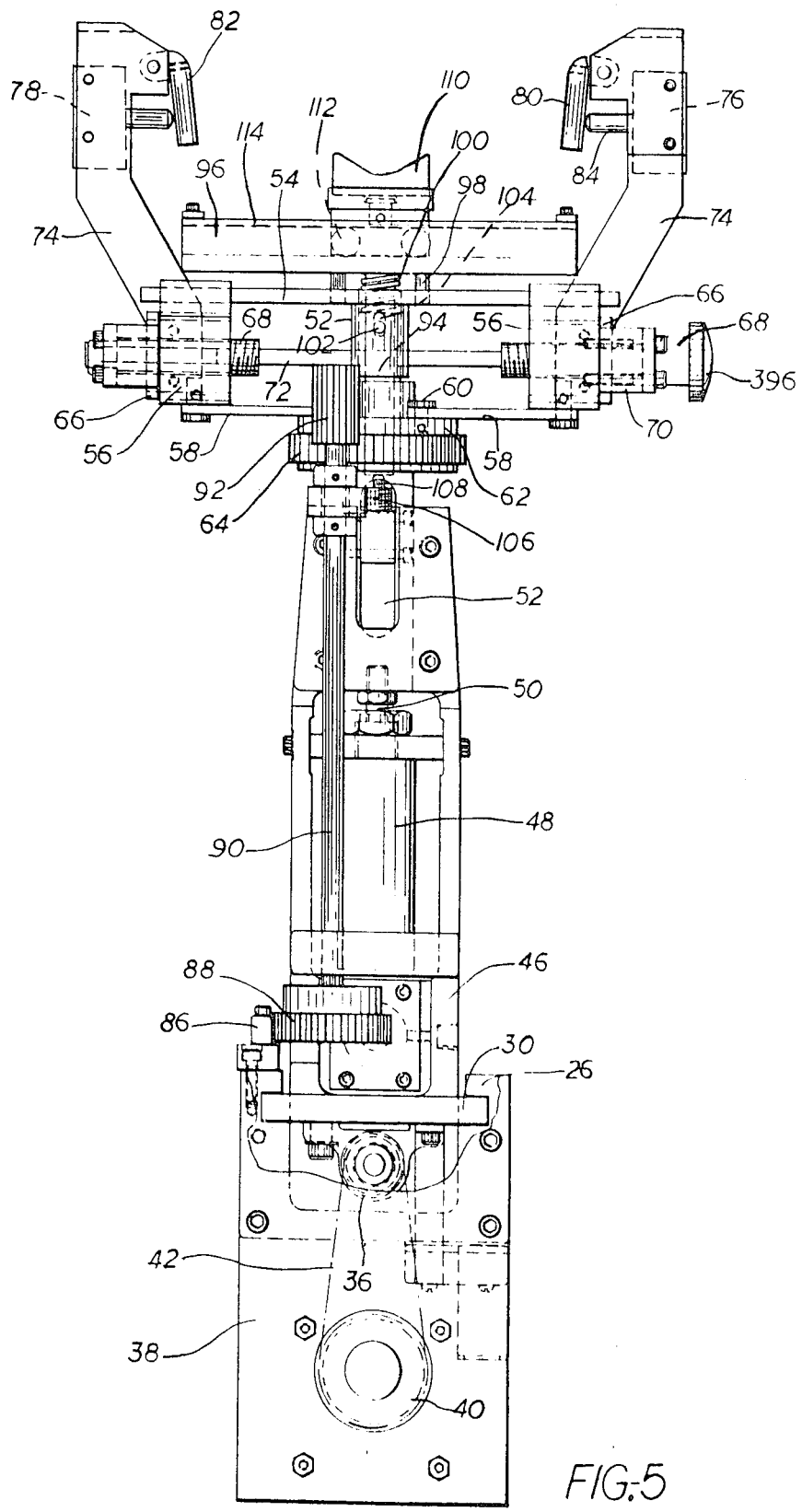
FIG. 5 is a view taken on the line 5—5 of FIG. 3.

Referring to FIGS. 3 and 5, a column 46 is mounted to and extends upwardly of the base 30. An air actuated motor 48 is mounted to the column 46. The piston rod 50 of the motor 48 is secured to a bar 52 that is mounted for heightwise movement in the column 46. A beam 54 is secured to the top of the bar 52 and extends laterally of the bar on opposite sides thereof. A block 56 is slidably mounted on each end of the beam 54 for inward-outward movement. A link 58 is pivoted at its outer end to each block 56. The inner end of each link 58 is pivoted by a pin 60 to the periphery of a hub 62 that is secured to a gear 64. The hub 62 and the gear 64 are rotatably mounted on the bar 52, and the pins 60 are mounted to diametrically opposed portions of the periphery of the hub 62. A block 66 is slidably mounted on each block 56 for inward-outward movement. Oppositely threaded screws 68 are rotatably mounted to flanges 70 that are secured to the blocks 56. The screws 68 are threaded into the blocks 66. A square shaft 72 is secured to one of the screws 68 and is slidably received in a square hole in the other screw 68. A mount 74 is secured to and extends upwardly of each block 66. Valves 76 and 78 are secured to the mounts 74. Gauges 80 and 82, pivotally mounted to the brackets 74, are located in alignment with the valve stems 84 of the valves 76 and 78. A rack 86, secured to the platform 26, is in mesh with a gear 88. The gear 88 is secured to a shaft 90 that is rotatably mounted in the column 46. A gear 92, that is secured to the top of the shaft 90, is in mesh with the gear 64.

A rod 94 is slidably mounted in the bar 52 for heightwise movement and extends through an opening in the beam 54. The top of the rod 94 is secured to a mount 96. Pins 98 extend downwardly from the mount 96 into openings in the beam 54 to guide the mount for heightwise movement. A compression spring 100 extends between the top of the bar 52 and the mount 96 to yieldably urge the mount upwardly. A pin 102, secured to the bar 52, extends into a groove 104 in the rod 94 to prevent the bar from twisting about its axis. The engagement of the pin 102 with the bottom of the groove 104 limits the extent that the spring 100 can urge the mount 96 upwardly. A valve 106, that is secured to the bar 52, has an upwardly extending valve stem 108 that is in alignment with the bottom of the rod 94. A toe rest 110 is movably mounted in the mount 96 for lateral movement by means of rolls 112 that are rotatably mounted to the toe rest and are received in gibs 114 that are secured to the mount 96.

A lever 116 is pivoted intermediate its ends to the column 46. The upper end of this lever has a brake pad 118 secured thereto that is movable toward and away from the bar 52. The lower end of this lever is in alignment with the piston rod 120 of an air operated spring return motor 122 that is mounted to the column 46.

Referring to FIGS. 3 and 6, a base 124 is secured to the platform 26 rearwardly of the column 46. A column 126 is mounted to the base 124 for lateral movement by means of gibs 128 on the column that are slidable in the base. An air actuated motor 130 is mounted on a flange 132 that is secured to the base 124. The piston rod 134 of the motor 130 is secured to the column 126 whereby the motor effects lateral movement of the column. A nut 136 is located on each side of the base 126 and is threaded onto a bolt 138. Each bolt 138 is adjustably secured to the column 126 by locknuts 140. The nuts 136 by engagement with the sides of the base 124 limit the extents of lateral movement that can be imparted to the column 126 by the motor 130.

The mount 10 is mounted to the column 126. A bracket 142, secured to the top of the mount 10, pivotally supports a spindle 144 by a laterally extending pin 146. A last support plate 148 is pivotally mounted on the forward-rearward axis of the spindle 144 and a last pin 150 is secured to and extends upwardly of the plate 148. Due to the ability of the spindle 144 to swing about the axis of the pin 146 and the plate 148 to swing about the axis of the spindle 144, the plate 148 and the pin 150 are flexibly mounted to the mount 10 so as to be capable of having limited universal movement with respect to the mount 10.

Referring to FIGS. 1, 2, 7 and 8, a head 152 is mounted rearwardly of the mount 10. The head 152 and gibs 154 that are bolted to the head form a guideway in which a slide plate 156 is mounted for forward-rearward movement. A plate 158 is spaced above the plate 156 at its forward end and is connected to the plate by means of spacers 160 (FIG. 2) and bolts 162 (FIG. 8). A fluid actuated motor 164, that is pivoted to a clevis 166 on the head 152, has a piston rod 168 that is secured to a bracket 170 depending from the plate 156. A U-shaped heel clamping pad 172 is mounted to the front of the plate 156 in the manner shown in Pat. No. 3,436,779.

A wiper slide 174 is slidably mounted for forward-rearward movement in guideways 176 formed in the upper surface of the plate 156. An air actuated motor 178 is mounted to a bracket 180 that is secured to the rear of the plate 156. The piston rod 182 of the motor 178 is secured to a bar 184 that is mounted to the slide 174. Slidably mounted to the upper surface of the front end of the plate 156 are a pair of wiper cams 186 to which are mounted the heel wipers 12 which are symmetrically disposed longitudinally of the machine. A pair of links 190 pivotally connect the wiper slide 174 and the wiper cams 186 so that motion may be transmitted to the wiper cams 186 and the wipers 12 in response to forward-rearward movement of the wiper slide 174 by the motor 178. For the purpose of guiding the wiper cams and the wipers in a desired path, rollers 192 are rotatably mounted to the plate 156 and protrude into cam slots 194 and 196 formed in the wiper cams. The plate 158 overlies the wiper cams so that the wiper cams are guided for movement between the plates 156 and 158.

Referring to FIGS. 2, 7, 9 and 10, a cover 198 is secured to the head 152 and extends over the plate 158. A pair of gibs 200, bolted to the cover 198, guide a slide 202 for forward-rearward movement. An air actuated motor 204 is mounted to a bar 206 that is secured to the gibs 200. The piston rod 208 of the motor 204 is secured to a post 210 formed on the slide 202. An air actuated motor 212, mounted to the slide 202 forwardly of the post 212, has an upwardly extending piston rod 214. A block 216, secured to the piston rod 212, is pivoted by a pin 218 to a pair of links 220 and 222. The link 220 extends rearwardly and upwardly of the pin 218 and is pivoted at its rear, by a pin 224, to the post 210. The link 222 extends forwardly and upwardly of the pin 218 and is pivoted at its front, by a pin 226, to a block 228. The bottom of the block 228 is pivoted to the slide 202 by a pin 230. A lug 232, mounted to the post 210, is in alignment with a block 234, mounted on one of the gibs 200, to limit the extent that the motor 204 can move the slide 202 and the parts carried thereby forwardly.

Referring to FIGS. 9–14, an applicator-hold-down unit 235 is mounted to the block 228. The unit 235 comprises a rod 236 that is secured to and extends downwardly of the block 228. A housing 238 is secured to the bottom of the rod 236. A flange 239 is secured to the housing 238, and a spindle 240 extends downwardly of the flange 239. The bottom of the spindle 240 is formed into a hold-down foot 242. A pair of hold-down feet 244 (see also FIG. 2) are mounted to and depend from the housing 238 and are located forwardly of the foot 242. A plate 246 is slidably mounted for forward-rearward movement in gibs 248 formed in the flange 239.

A bolt 250 is threaded into a lug 252 that extends from a plate 254, the plate 254 being secured to the bottom of the flange 239. A stem 256, secured to the plate 246, extends between a pair of collars 258 formed on the bolt 250. The rotation of the bolt 250, by a knob 260 secured thereto, thus effects forward-rearward movement of the plate 246.

The bottom of the plate 246 is formed into regions 262 and 264, the region 262 being at a higher elevation than the region 264. The regions 262 and 264 are separated by inclined regions 266 that diverge rearwardly and outwardly along the plate 246.

A hub 268 is rotatably mounted to the spindle 240 below the plate 246. A lever 270 is located between the hub 268 and the plate 246. A pair of pins 272 extend from the lever 270 into lugs 274 that are secured to the hub 268 to thus pivotally mount the lever to the hub in such a manner that the lever is rotatable with the hub. A first end of the lever is resiliently urged upwardly about the axis of the pins 272 by a compression spring 275 interposed between the lever and the hub to thereby resiliently urge a follower in the form of a ball 276, secured to this end of the lever, against the bottom of the plate 246. The other end of the lever 270 extends between a pair of pins 277 mounted on a valve stem 278. The valve stem 278 is mounted for heightwise movement in the hub 268.

A nozzle 280 extends radially from the bottom of the hub 268 on the opposite side of the hub from the ball 276. The nozzle 280 communicates with passages 282 and 284 in the hub. The valve stem 278, which extends into the passage 284, in its lower FIG. 11 position blocks communication between the passages 282 and 284 and when raised from the FIG. 11 position to an open position permits communication between these passages. The passage 284 is in communication with a groove 286 formed on the periphery of the spindle 240, and the groove 286 is in communication with ports 288 and 290 formed in the spindle 240 and the flange 239. The port 290 is in communication with a nipple 292 that is threaded into the flange 239.

Referring to FIGS. 9 and 15, a gear 294, secured to the hub 268, is in mesh with a gear 296. The gear 296 is mounted to a shaft 298 that forms part of an air actuated motor 300 that is mounted to the housing 238. The motor 300 comprises end compartments 302 and 304, a large middle compartment 306 and a small middle compartment 308. The shaft 298 extends into the end compartment 302 and a shaft 310 is rotatably mounted in the compartment 304. A wall 312 separates the compartment 302 from the compartments 306 and 308 and a wall 314 separates the compartment 304 from the compartments 306 and 308. Sprockets 316 and 318, respectively mounted to the shafts 298 and 310, are drivingly connected by an endless chain 320. One run of the chain 320 extends through relatively large openings in the walls 312 and 314 and through the compartment 306 and has a relatively large diameter piston 322 secured thereto that bears against the periphery of the compartment 306. The other run of the chain 320 extends through relatively small openings in the walls 312 and 314 and has a relatively small diameter piston 324 secured thereto that bears against the periphery of the compartment 308.

Figure 16:
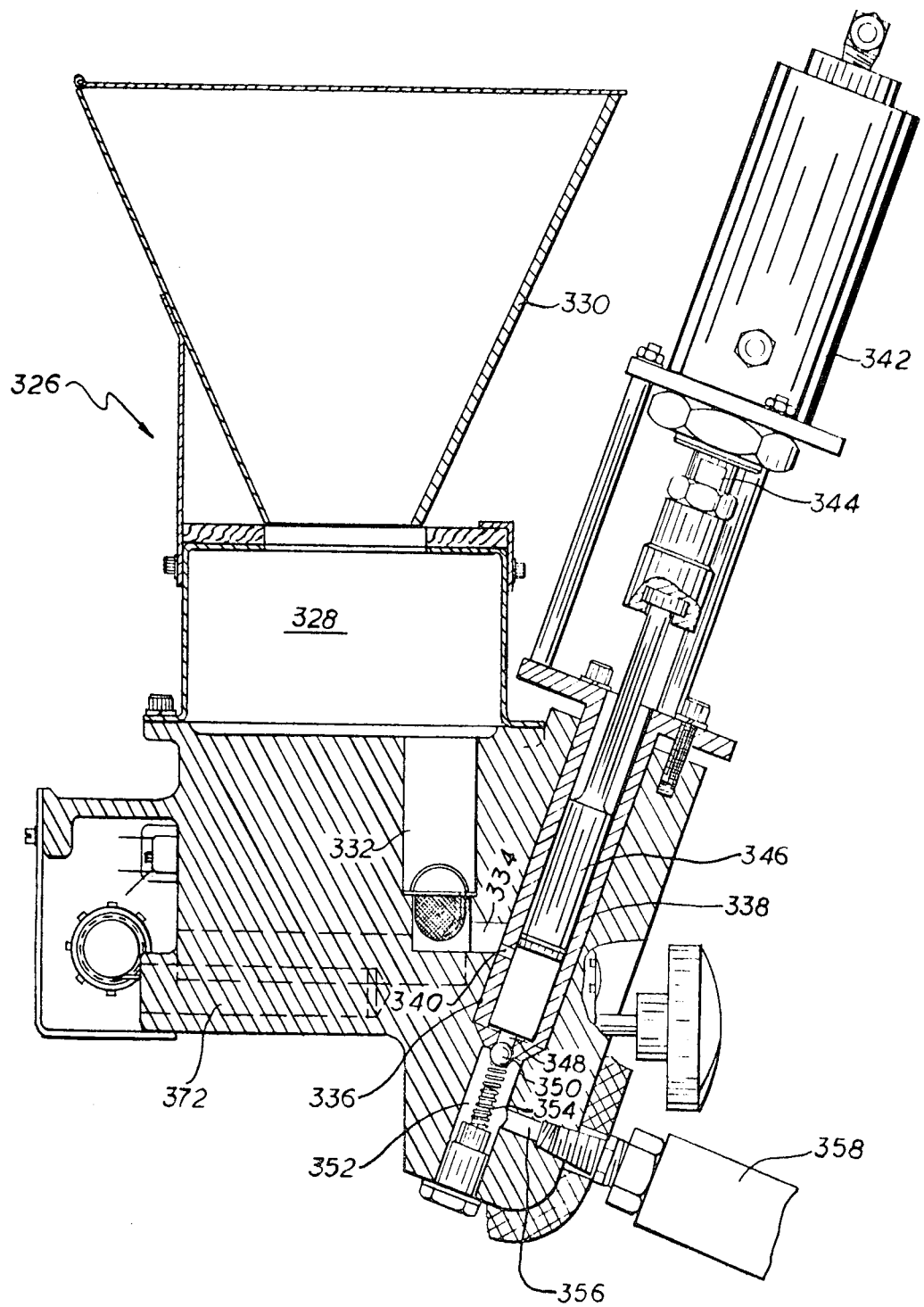
FIG. 16 is a section of a cement melting and pumping mechanism.

As shown in FIGS. 1 and 2, a cement melting and pumping mechanism 326 is mounted to the machine frame. Referring to FIG. 16, the mechanism 326, which is constructed similarly to the mechanism of application Ser. No. 840,291 filed July 9, 1969, comprises a chamber 328 located beneath a funnel 330. A chamber 332 is located below and in communication with the chamber 328. The chamber 332 is in communication with a passage 334 that intersects a heightwise extending bore 336. A tube 338, fitted in the bore 336, has a port 340 that is in communication with the passage 334. An air operated motor 342 is mounted to the tube 338. The piston rod 344 of the motor 342 is connected to a plunger 346 that is slidably mounted in the tube 338. A port 348 in the bottom of the tube 338 is normally closed by a ball valve 350 that is located in an orifice 352. A compression spring 354 acts to yieldably urge the ball valve 350 into its normal closing position with respect to the port 348. A port 356 provides communication between the orifice 352 and one end of a flexible hose 358.

The end of the hose 358 remote from the mechanism 326 is connected to a filter 360 (FIGS. 2, 9 and 10), and the filter 360 is in communication with the port 290 (FIG. 12) by being mounted to the nipple 292 (FIG. 10).

Figure 11:
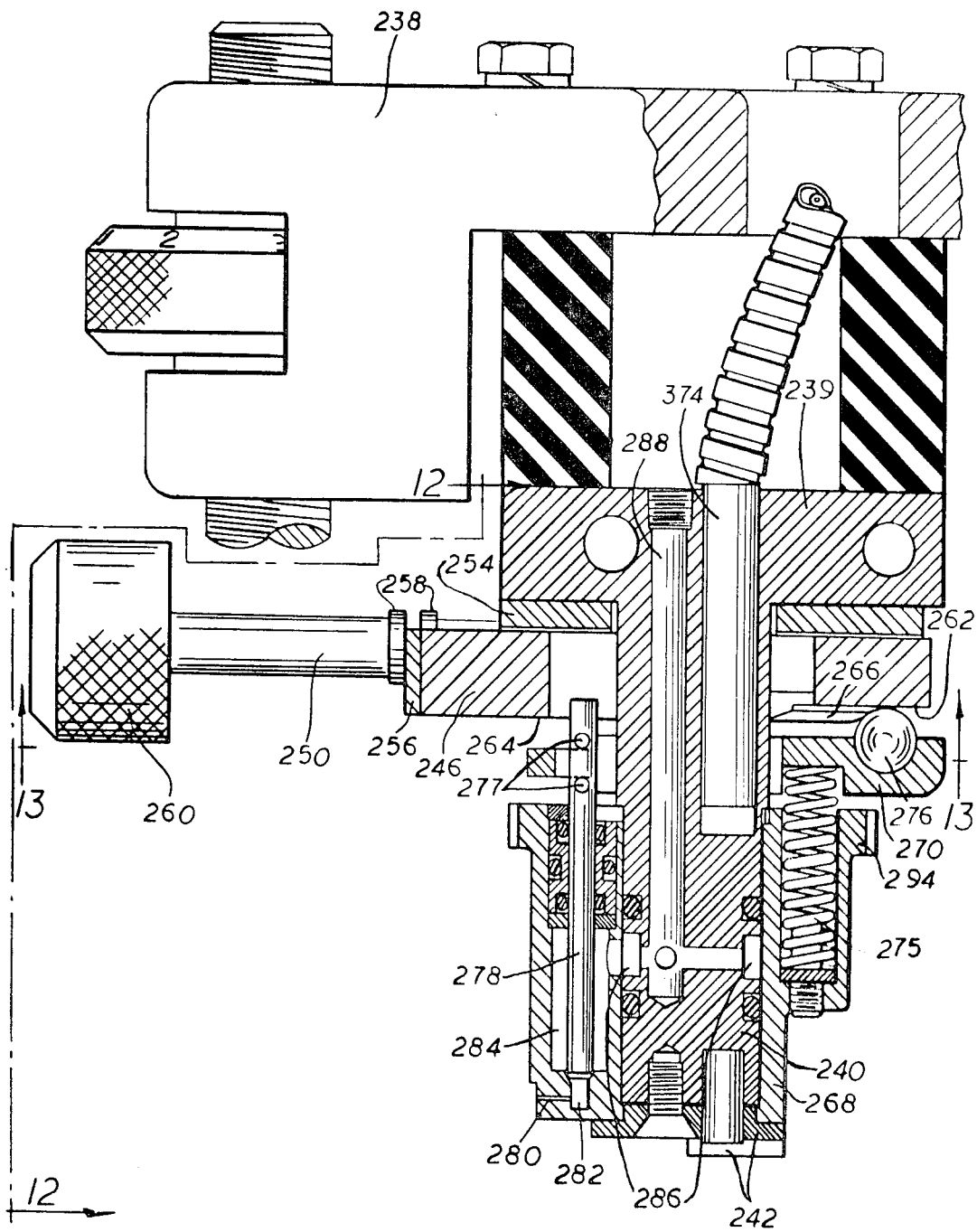
FIG. 11 is an elevation of the cement applying mechanism.
Figure 12:
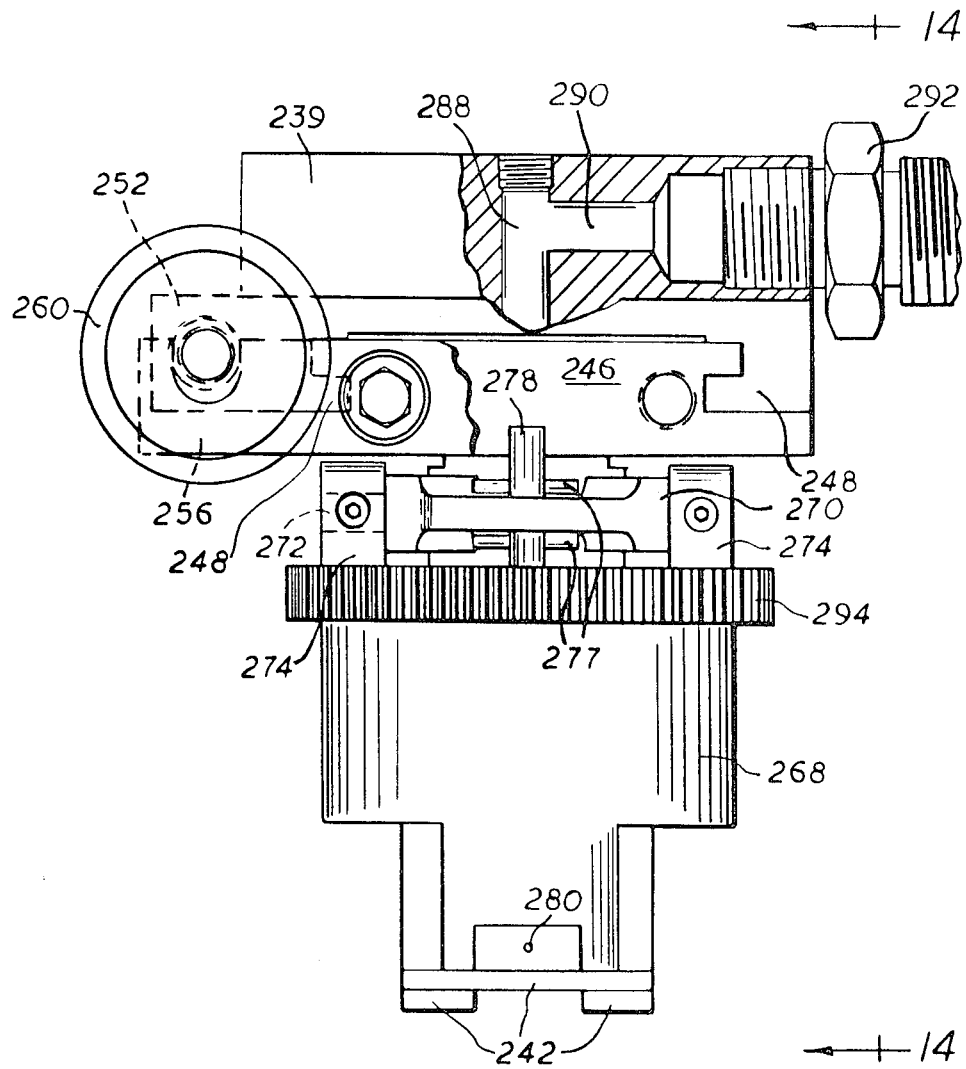
FIG. 12 is a view taken on the line 12—12 of FIG. 11.
Figure 13:
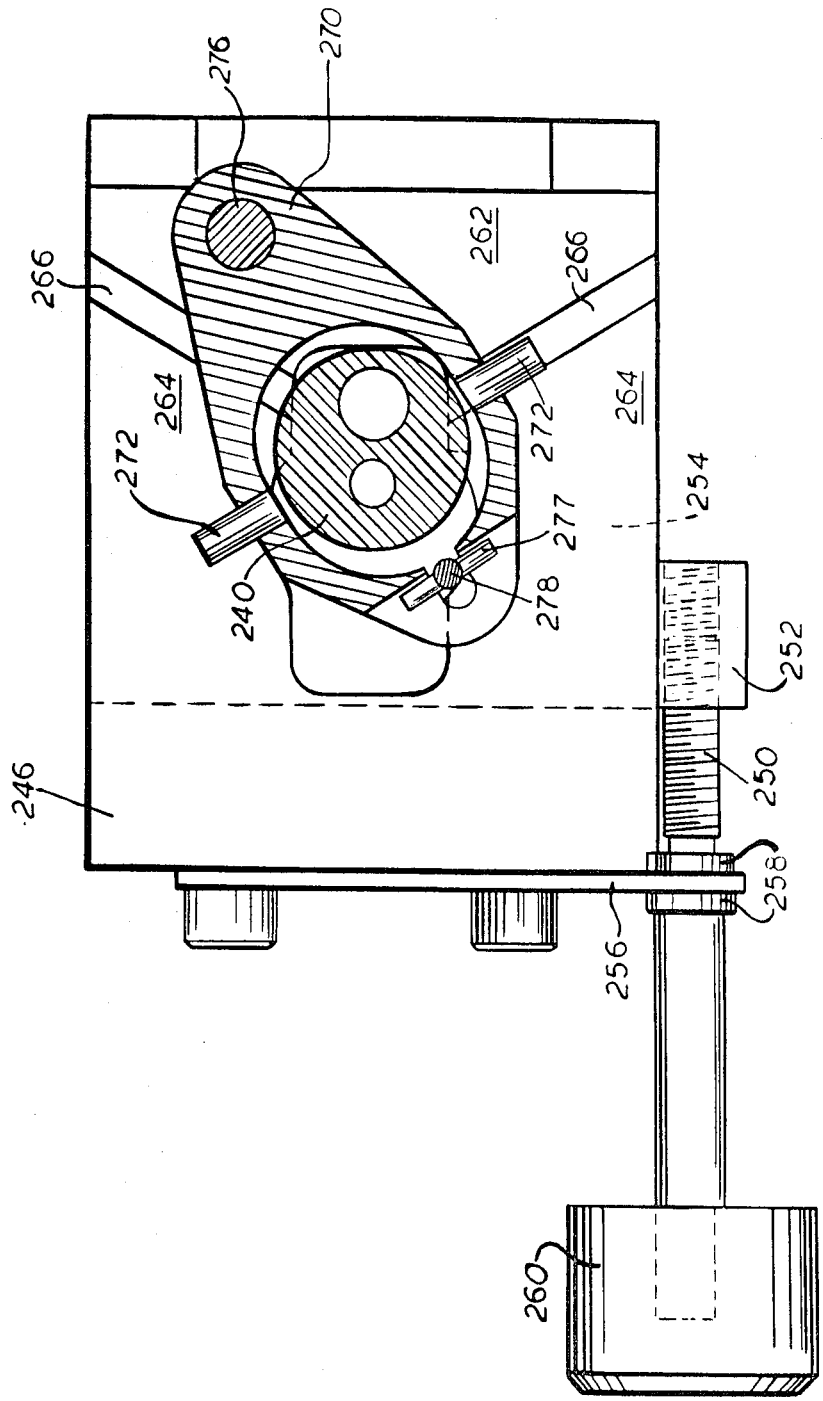
FIG. 13 is a view taken on the line 13—13 of FIG. 11.

In the idle condition of the machine: the piston rod 18 is retracted into the motor 16 so that the post 20 and the parts supported by the post 20, including the gauges 80, 82, the toe rest 110, the pltae 148 and the last pin 150, are in a lower position; the piston rod 50 is retracted into the motor 48 so that the gauges 80, 82 and the toe rest 110 are in a lower position with respect to the column 46; the piston rod 120 is retracted into the motor 122 by its return spring 362 (FIG. 3) so that the brake pad 118 is not in pressing engagement with the bar 52; no pressurized air is entering the motor 130 so that the column 126 is movable along the gibs 128; the piston rod 168 is retracted into the motor 164 to maintain the slide plate 156 in a rearward position; the pad 172 is maintained in open position with its legs 364 (FIG. 8) relatively far apart from each other by a pair of air operated motors 366, one of which is shown in FIG. 7, in the manner shown in Pat. No. 3,436,779; the piston rod 182 is retracted into the motor 178 so that the wipers 12 are in the rearward open position shown in FIG. 8; the piston rod 208 is retracted into the motor 204 and the piston rod 214 is retracted into the motor 212 so that the applicator-hold-down unit 235 is in a rearward, upper position; pressurized air is entering the end compartment 304 of the motor 300 through a line 368 while the end compartment 302 is vented to atmosphere through a line 370 to cause the piston 322 to abut the wall 312 and the piston 324 to abut the wall 314 and thus cause the hub 268 and the lever 270 to be turned to a position wherein the ball 276 bears against the higher region 262, as seen in FIGS. 11 and 13, with the valve stem 278 blocking communication between the passages 282 and 284 (FIG. 11); and the piston rod 344 is retracted into the motor 342 so that the plunger 346 is above the port 340.

Granules of thermoplastic cement, that are solid at ambient temperatures and becomes molten and adherent when heated above a predetermined temperature, are placed in the funel 330 of the mechanism 326 and gravitate through the chamber 328 into the chamber 332 where they are melted by an electric cartridge heater 372 (FIG. 16). The molten cement gravitates from the chamber 332 through the passage 334 and the port 340 into the tube 338 to fill that portion of this tube that extends between the plunger 346 and the ball valve 350. The motor 342 is now actuated to reciprocate the plunger 346 a number of times and thus pump the molten cement from the tube 338 through the orifice 352, the port 356, the hose 358, the ports 290 and 288, and the groove 286 into the passage 284 until it fills the passage 284. During each downstroke of the plunger 346, the movement of the bottom of the plunger below the port 340 causes the ball valve 350 to open and the cement in the tube 338 to be pumped through the port 348 into the orifice 352. During each upstroke of the plunger 346, the movement of the bottom of the plunger above the port 340 enables cement to flow through the port 340 to fill that portion of the tube 338 that lies between the bottom of the plunger and the ball valve 350. At the end of these reciprocations, the plunger reassumes its idle position above the port 340. An electric heater (not shown) is located in the hose 358 and an electric heater 374 (FIG. 11) is located in the flange 239 to maintain the cement molten between the tube 338 and the passage 284.

Figure 19:
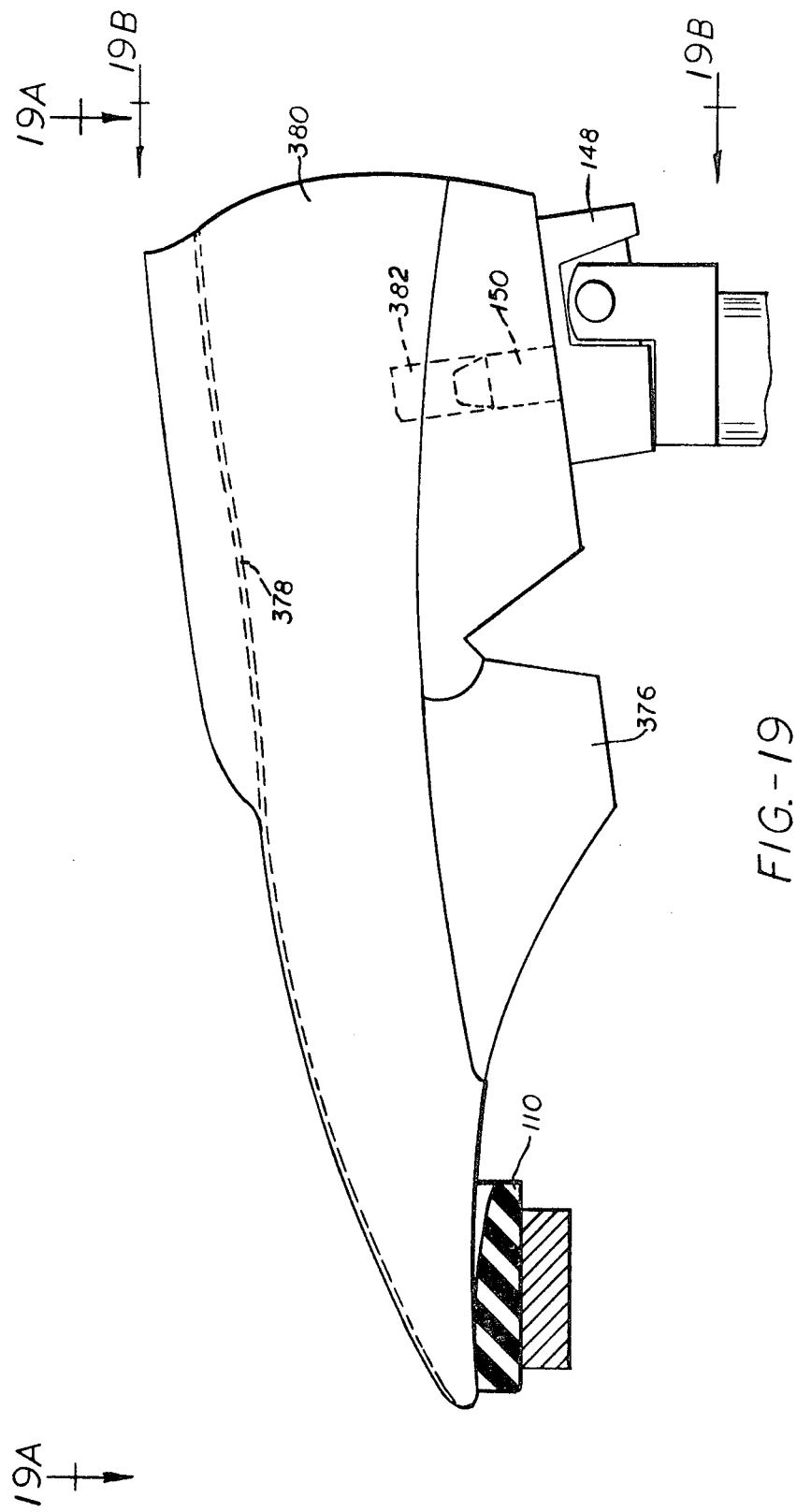
FIG. 19 is a representation of the shoe assembly as it appears in the machine at the beginning of the machine cycle.

Referring to FIGS. 19, 19A and 19B, a shoe assembly comprising a last 376 having an insole 378 secured to its bottom and an upper 380 mounted thereon is placed bottom-up on the last support constituted by the last pin 150 and the plate 148 with the pin 150 entering the thimble hole 382 of the last and the plate 148 bearing against and supporting the top of the heel portion of the last. Preferably, a pulling over and toe lasting operation has previously been performed on the shoe assembly in a machine such as that shown in patent application Ser. No. 858,667 filed Sept. 17, 1969. The shoe assembly and the plate 148 are swung counterclockwise (FIG. 19) so as to cause the top of the vamp of the upper to bear against the toe rest 110.

The shoe assembly is supported on the plate 148 during the below described heel wiping operation. During this operation, the line of symmetry of the periphery of the heel of the shoe assembly should coincide with the line of symmetry of the heel wipers 12. Because the vamp of the shoe assembly is laterally offset from the heel, the vamp must be offset from the line of symmetry of the heel wipers in order for the line of symmetry of the heel periphery to coincide with the line of symmetry of the heel wipers, the direction of offset being dependent on whether a shoe assembly for a left foot or a right foot is being operated on. As seen in FIG. 19B, because the last thimble 382 is offset from the center line of the last, the last pin 150 must be offset from the center line of the last in order for the heel periphery to lie on the line of symmetry of the heel wipers 12. The direction of offset of the last thimble from the center line of the last is dependent on whether it is a last for a left foot or a right foot.

The pneumatic control circuit of the machine includes a plurality of manifolds that are supplied by Humphrey Products of Kalamazoo, Mich. The manifolds are so constituted that the admission of pressurized air to certain ports will alter their internal condition so as to cause pressurized air to pass out of the manifold from other ports.

Figures 17, 18:
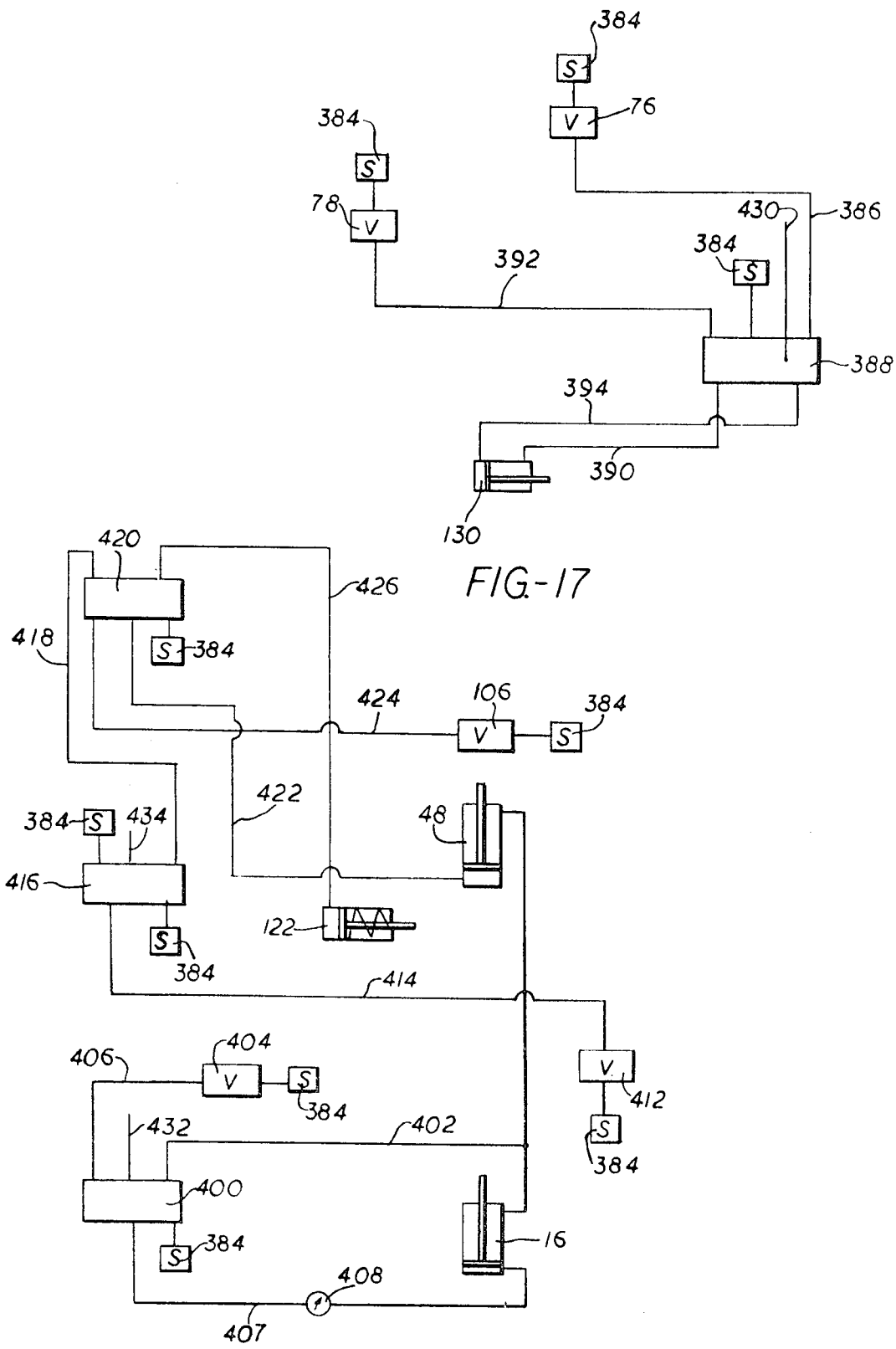
FIGS. 17 and 18 are schematic representations of portions of the machine control circuit.

Assuming that a shoe assembly for a left foot is being operated on, the operator swings the shoe assembly counterclockwise (FIG. 19A) about the support plate 148 and the last pin 150 with the top of the vamp of the shoe assembly moving the toe rest 110 laterally along the mount 96 until the side of the toe rest engages the gauge 80 to momentarily open the valve 76. Referring to FIG. 17, the momentary opening of the valve 76 enables a pulse of pressurized air to pass from a source 384 through the valve 76 and a line 386 to a manifold 388. This causes pressurized air to pass from the source 384 through the manifold 388 and a line 390 to the motor 130 to actuate this motor to shift its piston rod 134 leftwardly (FIG. 6) until the right nut 136 engages the base 124 to thereby cause the last pin 150 and the plate 146 to shift leftwardly as seen in FIGS. 6 and 19B and downwardly as seen in FIG. 19A.

If a shoe assembly for a right foot is being operated on, the operator swings the shoe assembly clockwise (FIG. 19A) about the last pin until the side of the toe rest momentarily engages the gauge 82 to momentarily open the valve 78. This enables a pulse of pressurized air to pass from the source 384 through the valve 78, a line 392, the manifold 388 and a line 394 to the motor 130 to actuate this motor to shift its piston rod 134 rightwardly as seen in FIGS. 6 and 19B and upwardly as seen in FIG. 19A until the left nut 136 engages the base 124 to thereby cause the last pin 150 and the plate 146 to shift rightwardly.

Put another way, the engagement of the toe rest with one of the gauges 80, 82 causes the last pin 180 and the plate 146 to urge or shift the heel portion of the shoe direction laterally in a direction that corresponds to the side of the longitudinal center line of the shoe assembly on which the gauge engaged by the toe rest is located.

For the particular style of shoe assembly being operated on, the lateral positions of the gauges 80 and 82 have been so adjusted by the rotation of a knob 396 (FIG. 5) secured to one of the bolts 68 and the positions of the nuts 136 have been so adjusted by the locknuts 140 that the heel periphery of the shoe assembly now bears the desired symmetrical relationship with respect to the leading edges of the heel wipers 12. When changing the length of the shoe assembly without changing its style, it is merely necessary to operate the motor 44 to rotate the screw 32 in such a direction as to move the base 30 together with the column 46, the gauges 80, 82 and the toe rest 110 further from the last pin 150 for a longer shoe and to move these members closer to the last pin 150 for a shorter shoe. During this movement, the gear 88 moves along the rack 86 to cause the shaft 90 to rotate in one direction or the other thereby causing the gear 64 to rotate so as to cause the links 58 to move the gauges 80, 82 inwardly or outwardly. The links 58 are so constructed that the movement of the toe rest 110 further from the last pin causes the gauges 80, 82 to move outwardly and the movement of the toe rest closer to the last pin causes the gauges to move inwardly. Therefore, the operation of the motor 44 to adjust the spacing of the toe rest with respect to the last pin for a different length of shoe also acts to change the spacing between the gauges 80, 82 for this different length of shoe.

Now, the motor 204 is actuated to project its piston rod 208 forwardly and thus move the applicator-hold-down unit 235 forwardly from its initial out-of-the-way position to a working position above the shoe assembly. This is followed by an actuation of the motor 212 to raise its piston rod 214 and thus swing the block 228 about the pivot 230 and lower the unit 235 to a position wherein the hold-down constituted by the hold-down feet 242, 244 lies in a horizontal plane that is slightly below the level of the bottoms of the heel wipers 12.

Referring to FIG. 18, the motors 16 and 48 are maintained in their idle positions by pressurized air passing from the source 384 through a manifold 400 and a line 402 to these motors. The movement of the applicator-hold-down unit 235 to its working position by the motor 204 causes a valve 404 (FIGS. 9 and 10) to be shifted. The shifting of the valve 404 enables pressurized air to pass from the source 384 through the valve 404 and a line 406 into the manifold 400 which causes the air in the line 402 to vent to atmosphere through the manifold 400 and causes pressurized air to pass from this manifold through a line 407, having a pressure regulator 408 therein, to the motor 16. The motor 16 is thus actuated to raise the post 20 and the parts carried thereby, including the last pin 150, the plate 148 and the toe rest 110 until the insole 378 bears against the hold-down feet 242, 244. The flexible mounting of the pin 150 and the plate 148 to the mount 10 enables the pin 150 and the plate 148 to move with respect to the mount 10 during this rise until the heel seat portion 409 (FIGS. 20 and 20A) of the insole bears flushly against the hold-down feet 242, 244 to thereby level the insole heel seat against the hold-down feet and locate it in a plane parallel to and slightly below the plane of the bottoms of the heel wipers 12. During the rise of the shoe assembly, the operator may let go of the shoe assembly, the shoe assembly staying proximate to the gauge 80 or 82 due to inertia and being locked in this position at the end of the rise due to being clamped between the plate 148 and the hold-down feet 242, 244. The leveling of the insole heel seat 409 against the hold-down feet 242, 244 causes the top of the vamp of the upper to rise upwardly of the toe rest 110, the extent of this rise being dependent on the style of the shoe.

During the rise of the post 20, a cam 410 (FIG. 3), that is connected to the platform 26, momentarily opens a valve 412 that is mounted to the base 14 to cause a pulse of air to pass from the source 384 through the valve 412 and a line 414 to a manifold 416. This causes pressurized air to pass from the source 384 through the manifold 416 and a line 418 to a manifold 420 to actuate this manifold. The actuation of the manifold 420 causes pressurized air to pass from the source 384 through the manifold 420 and a line 422 to the motor 48 to actuate this motor to raise its piston rod 50 together with the bar 52 and the toe rest 110. The engagement of the toe rest 110 with the top of the vamp of the upper, during the rise of the toe rest, causes the rod 94 to open the valve 106. The opening of the valve 106 enables pressurized air to pass from the source 384 through the valve 106 and a line 424 to the manifold 420 to so actuate this manifold that the flow of pressurized air in the line 422 is cut off and pressurized air passes from this manifold through a line 426 to the motor 122 to actuate this motor to press the brake pad 118 against the bar 52 and thus lock the toe rest 110 against movement.

From the foregoing it can be seen that, after the shoe assembly has been clamped between the plate 148 and the feet 242, 244 with the insole heel seat portion 409 at the suitable level for the below described heel wiping operation, the toe rest 110 is brought to a position where it bears against the top of the vamp of the upper, regardless of the distance that the vamp is above the toe rest, and is locked in this position. It is desirable to have the toe rest bear against the vamp during the wiping operation to assist in preventing the shoe assembly from twisting and thus maintain the insole heel seat portion 409 in the desired plane.

By having the toe rest 110 at such a level that the vamp of the shoe assembly is tilted downwardly, as shown in FIG. 19, to engage the toe rest, the machine is able to accommodate shoe assemblies whose heels are of different heightwise dimensions without adjusting the elevation of the toe rest. Similarly, by having the toe rest bear against the shoe assembly only after the insole heel seat portion 409 has been clamped between the plate 148 and the feet 242, 244 in the desired plane suitable for wiping, it is unnecessary to manually adjust the elevation of the toe rest when a shoe assembly having a vamp with a different heightwise dimension is placed in the machine.

At the same time that the motor 16 was actuated to raise the post 20, the motor 342 was actuated to lower the plunger 346 and thus force cement under pressure into the hose 358. The valve stem 278 prevents the cement from exiting from the passage 284 at this time, so that the cement pressure caused by the lowering of the plunger 346 is taken up by the elastic wall of the hose 358.

Figure 20:
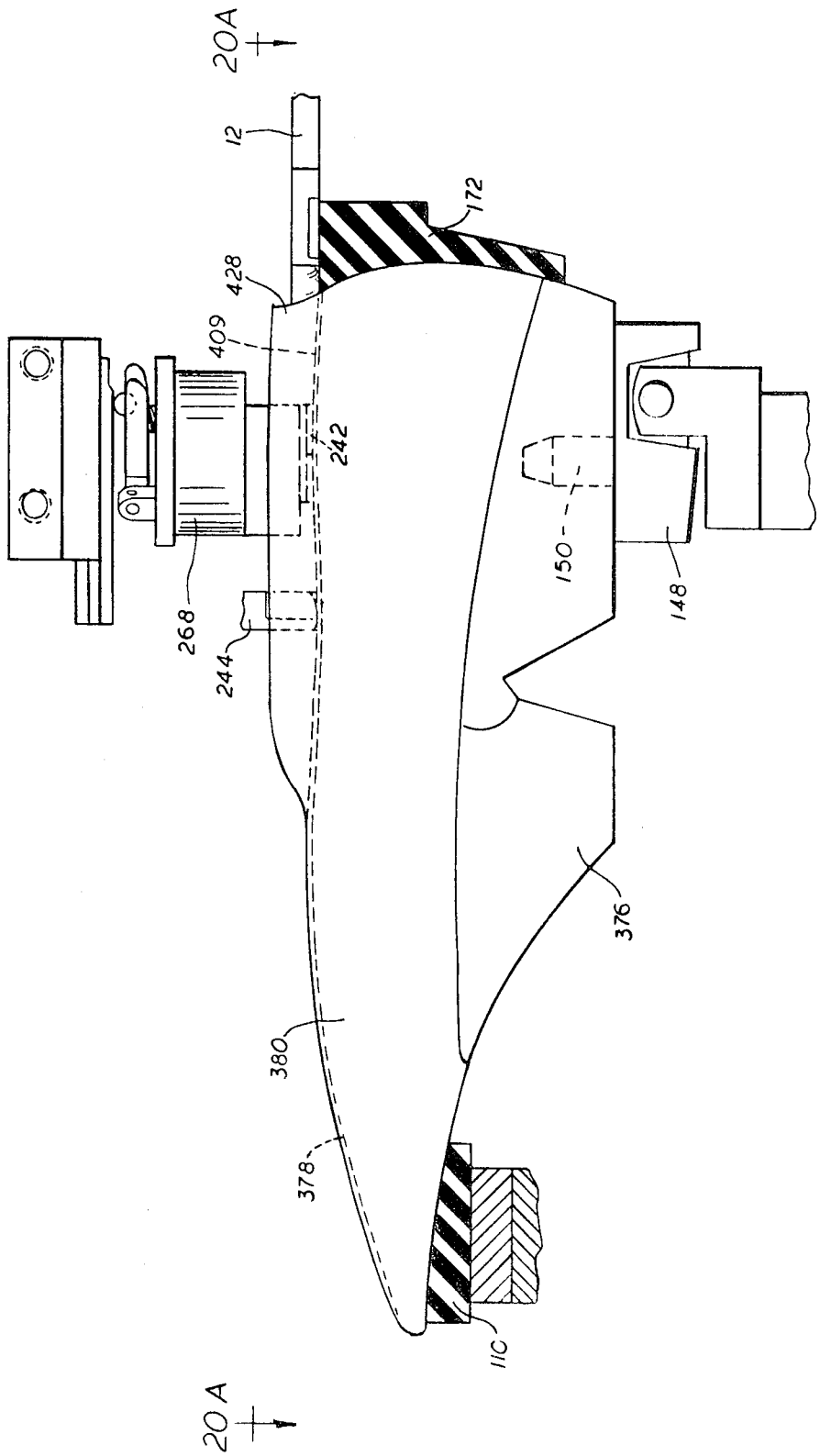
FIG. 20 is a representation of the shoe assembly as it appears in the machine during the cement spraying operation.
Figure 20A:
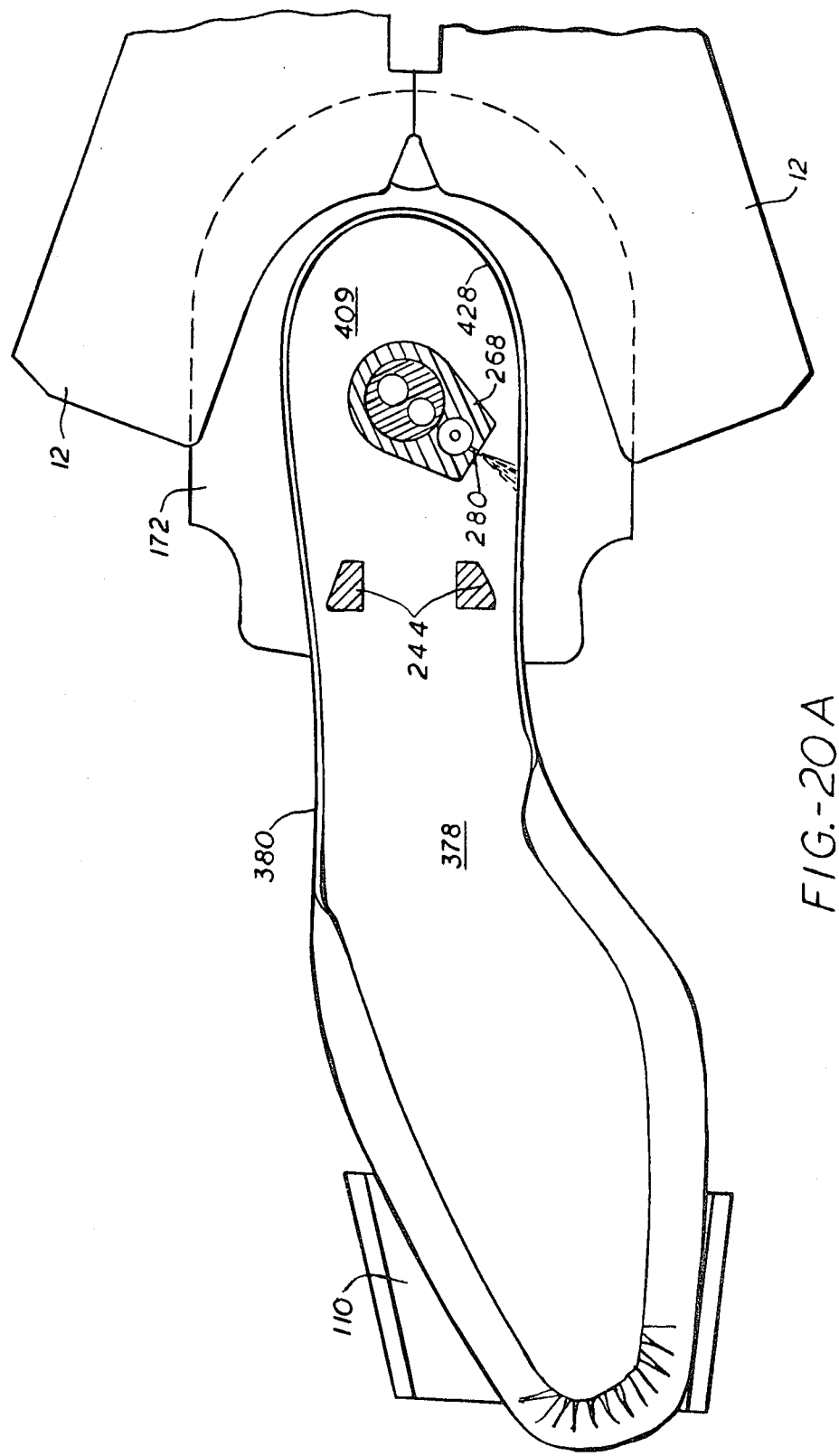
FIG. 20A is a view taken on the line 20A—20A of FIG. 20.

Now the motor 164 is actuated to move the piston rod 168 forwardly and thus move the slide plate 156 and the pad 172 and the wipers 12 carried thereby forwardly until the bight of the pad 172 engages the heel of the shoe assembly with the wipers 12 located proximate to the shoe assembly in position to commence the heel wiping operation. In the manner shown in the aforementioned Pat. No. 3,436,779, this causes the motors 366 to operate the pad 172 so as to cause the pad to firmly engage the shoe assembly and clamp the heel portion of the upper 380 against the last 376, as shown in FIGS. 20 and 20A, with the heel portion of the upper margin 428 extending upwardly of the insole heel seat portion 409.

At this time, the end compartment 304 of the motor 300 is vented to atmosphere through the line 368 and pressurized air is forced into the end compartment 302 through the line 370 to cause the piston 322 to move from the wall 312 to the wall 314 and the piston 324 to move from the wall 314 to the wall 312. This causes the top run of the chain 320, as seen in FIG. 15, to move rightwardly and, through the connection provided by the sprocket 316 and the gears 294, 296, causes the hub 268 and the lever 270 to swing counterclockwise, as seen in FIG. 13, about the axis of the spindle 240, through a predetermined arc. The swinging movement of the hub 268 and the lever 270 is terminated when the piston 312 engages the wall 314 and the piston 324 engages the wall 312. During this swinging movement the ball 276 moves along the higher region 262, down the uppermost inclined region 266, as seen in FIG. 13, about the lower region 264, up the lowermost inclined region 266 and back to the higher region 262. At the beginning of the swinging movement, the ball 276 lies above the longitudinal center line of the machine, as seen in FIG. 13, and at the end of the swinging movement the ball 276 lies below the longitudinal center line of the machine. The angles defined by a line extending from the ball 276 to the axis of rotation of the hub 268 and the longitudinal center line of the machine at the beginning and the end of the swinging movement are equal. During the period that the ball 276 moves along the lower region 264, the valve stem 278 is lifted by the lever 270 to open communication between the passages 282 and 284 and enable the cement under pressure in the passage 284 to be sprayed radially from the nozzle 280.

From the foregoing, it can be seen that no cement is sprayed from the nozzle 280 during its movement through the inoperative zones at the beginning and the end of the swinging movement of the hub 268 while cement is sprayed from the nozzle during its movement in an operative zone in an intermediate portion of this swinging movement. The cement is deposited on the upper margin 428 and/or the periphery of the insole heel seat portion 409 and acts to bond the upper margin to the insole during the below described wiping of the upper margin against the insole. The angular extent of the operative zone during which the cement is sprayed is dependent on the length of the lasting margin that is to be wiped against the insole, and this in turn is dependent on the length of the shoe assembly. In order to adjust the angular extent of the operative zone for the particular length of the shoe assembly being operated on, the plate 246 is adjusted forwardly or rearwardly by the knob 260 to move the inclined zones 266 forwardly or rearwardly to the desired position.

After the cement spraying operation is completed, the motor 178 is activated to move the wiper slide 174 forwardly, thereby imparting motion to the wipers 12 by means of the links 190. The leading edges of the wipers move forwardly and inwardly in a path determined by the configuration of the cam slots 194 and 196 so as to wipe the upper margin 428 against the insole heel seat 409 and bond the upper margin to the insole by means of the sprayed cement.

During the wiping operation, the motor 212 is actuated to raise the applicator-hold-down unit 235 out of the way of the wipers 12, and, at the end of the wiping stroke, the motor 16 is actuated to move the post 20 upwardly under heavier pressure than had heretofore been applied to apply bedding pressure between the wiped upper margin and the bottoms of the wipers. After the bedding pressure has been applied for a predetermined length of time, the machine cycle is completed, the parts are returned to their idle position and the shoe assembly is released.

In order to return the manifold 388 to its idle condition, pressurized air is caused to enter this manifold through a line 430 (FIG. 17) at the end of the machine cycle. This acts to shut off the flow of pressurized air to the motor 130 through the line 390 or the line 394.

The closing of the valve 404 when the machine parts are returned to their idle condition and the flow of pressurized air into the manifold 400 through a line 432 (FIG. 18) at the end of the machine cycle enables this manifold to return to its idle condition.

The flow of pressurized air to the manifold 416 through a line 434 at the end of the machine cycle enables this manifold to return to its idle condition and cut off the flow of air through the line 418 to the manifold 420. The cutting off of the flow of air through the line 418 enables the manifold 420 to return to its idle condition.

After the completion of the machine cycle, the end compartment 302 of the motor 300 retains pressurized air through the line 370 and the end compartment 304 remains vented through the line 368. During the next machine cycle, when the cement is to be sprayed out of the nozzle 280, the hub 268 is caused to swing from the position it assumed at the end of the first machine cycle back to the position it had assumed at the beginning of the first machine cycle.

I claim:

1. A heel lasting machine comprising: a support for supporting bottom-up and for lateral swinging movement the heel portion of a shoe assembly that comprises a last having an insole on its bottom and an upper mounted thereon with the heel of the shoe assembly facing rearwardly; symmetrically disposed wiping means located rearwardly of the support and mounted for movement from a retracted to an advanced position to wipe the heel portion of the margin of the upper against the insole; an actuable sensing mechanism located forwardly of the support on each side of the longitudinal center line of the shoe assembly at such positions that a lateral swinging of the shoe assembly causes actuation of one of the sensing mechanisms with the line of symmetry of the periphery of the heel of the shoe assembly disposed substantially parallel to, but offset from, the line of symmetry of the wiping means; and shifting means responsive to the actuation of each of the sensing mechanisms to urge the support laterally in such a direction and to such a position that the line of symmetry of the periphery of the heel portion of the shoe assembly substantially coincides with the line of symmetry of the wiping means.

2. A machine as defined in claim 1 further comprising: mount means mounting the sensing mechanisms for movement in unison toward and away from the support and for movement toward and away from each other; and means so constructing the mount means as to move the sensing mechanisms towards each other in response to movement of the sensing mechanisms in unison towards the support and to move the sensing mechanisms away from each other in response to movement of the sensing mechanisms in unison away from the support.

3. A machine as defined in claim 2 further comprising: adjusting means for moving the sensing mechanisms toward and away from each other independently of said mount means.

4. A machine as defined in claim 2 wherein said mount means comprises: a bar mounted for forward-rearward movement; a block mounted to the bar on each side of the bar for inward-outward movement; means mounting a sensing mechanism to each block; a hub rotatably mounted to the bar; a pair of links pivoted at the inner ends thereof to diametrically opposed portions of the hub periphery and pivoted at the outer ends thereof to said blocks; and drive means operative in response to movement of the bar forwardly and away from the support to rotate the hub in such a direction as to cause the links to move the blocks away from each other and operative in response to movement of the bar rearwardly and toward the support to rotate the hub in such a direction as to cause the links to move the blocks toward each other.

5. A machine as defined in claim 4 further comprising: adjusting means for moving the sensing mechanisms toward and away from each other independently of said mount means.

6. A machine as defined in claim 5 wherein said adjusting means comprises: a second block mounted to each of the first mentioned blocks for inward-outward movement; means mounting a sensing mechanism to each of the second blocks; and means for effecting inward-outward movement of the second blocks with respect to the first mentioned blocks.

7. A machine as defined in claim 4 further comprising: a platform; a column mounted to the platform for forward-rearward movement; and means mounting the bar to the column; and wherein said drive means comprises: a rack secured to the platform; a gear rotatably mounted to the column and in mesh with the rack; and means interconnecting the gear and the hub and responsive to the rotation of the gear pursuant to forward-rearward movement of the column with respect to the platform, to rotate the hub.

8. A machine as defined in claim 7 further comprising: adjusting means for moving the sensing mechanisms toward and away from each other independently of said mount means.

9. A machine as defined in claim 8 wherein said adjusting means comprises: a second block mounted to each of the first mentioned blocks for inward-outward movement; means mounting a sensing mechanism to each of the second blocks; and means for effecting inward-outward movement of the second blocks with respect to the first mentioned blocks.

10. A machine as defined in claim 1 further comprising: means so constructing the shifting means as to urge the support in the lateral direction that corresponds to the side of the longitudinal center line of the shoe assembly on which the actuated sensing mechanism lies.

11. A machine as defined in claim 1 wherein said shifting means comprises: a base; a column mounted to the base for lateral movement; means mounting the support to the column for movement therewith; a motor mounted to the base and operatively connected to the column; means responsive to the actuation of one of the sensing mechanisms to cause the motor to urge the column in a first lateral direction along the base; and means responsive to the actuation of the other sensing mechanism to cause the motor to urge the column in the lateral direction opposite from the first lateral direction along the base.

12. A machine as defined in claim 11 further comprising: means so interconnecting the sensing mechanisms and the motor as to cause the motor to urge the column in the lateral direction that corresponds to the side of the longitudinal center line of the shoe assembly on which the actuated sensing mechanism lies.

13. A machine as defined in claim 1 further comprising: a toe rest, mounted for lateral movement between the sensing mechanisms in intersecting relationship with the sensing mechanisms, adapted to support the vamp of the shoe assembly, said lateral swinging of the shoe assembly causing the toe rest to intersect and actuate the sensing mechanisms.

14. A machine as defined in claim 13 further comprising: means mounting the toe rest for heightwise movement; means for initially maintaining the toe rest in a lower position; means mounting the wiping means for planar movement; a mount mounted for heightwise movement; means mounting the support to the mount by a flexible connection such that said vamp may be lowered against the toe rest while the shoe assembly is being supported by the support and the toe rest is in said lower position; a hold-down, located above the support, whose bottom is in a plane substantially parallel to the plane of movement of the wiping means at a level slightly below the bottom of the wiping means; means for initially maintaining the mount in a lower position wherein the insole heel seat is below and spaced from the hold-down; means, operative subsequent to the operation of the shifting means, for raising the mount to bring the insole heel seat into engagement with the hold-down at a level suitable for wiping and to clamp the shoe assembly between the support and the hold-down with the flexible connection enabling said vamp to rise upwardly of the toe rest; and means, operative thereafter, for raising the toe rest into engagement with said vamp.

15. A machine as defined in claim 14 further comprising: means responsive to said engagement of the toe rest with said vamp to lock the toe rest against movement.

16. A machine as defined in claim 14 further comprising: a platform mounted for heightwise movement; means mounting the mount to the platform to thereby mount the mount for said heightwise movement, said raising of the mount being effected by the raising of the platform from an initial lower position; a column extending upwardly of the platform forwardly of the mount and mounted to the platform for heightwise movement with the platform; means mounting the toe rest to the column for heightwise movement; means for initially maintaining the toe rest in a lower position with respect to the column to thereby place the toe rest in the position wherein said vamp may be lowered against the toe rest; and means, operative subsequent to said clamping of the shoe assembly, to raise the toe rest with respect to the column to thereby effect said engagement of the toe rest with the vamp.

17. A machine as defined in claim 16 further comprising: means responsive to said engagement of the toe rest with said vamp to lock the toe rest against movement with respect to the column.

18. A machine as defined in claim 17 further comprising: a bar; means mounting the toe rest to the bar so as to yieldably urge the toe rest upwardly of the bar; means mounting the bar to the column for heightwise movement to thereby effect said mounting of the toe rest to the column for heightwise movement; a brake mounted to the column for movement towards and away from the bar; means for initially urging the brake away from the bar; and means responsive to the downward movement of the toe rest with respect to the bar, pursuant to said engagement of the toe rest with the vamp, to cause the brake to move against the bar and thereby effect said locking of the toe rest against movement with respect to the column.

19. A heel lasting machine comprising: a support for supporting bottom-up the heel portion of a shoe assembly that comprises a last having an insole on its bottom and an upper mounted thereon with the heel of the shoe assembly facing rearwardly; means mounting the support for heightwise movement; wiping means located rearwardly of the support and mounted for planar movement from a retracted to an advanced position to wipe the heel portion of the margin of the upper against the insole; a hold-down, located above the support, whose bottom is in a plane substantially parallel to the plane of movement of the wiping means at a level slightly below the level of the wiping means; a toe rest, located forwardly of the support, mounted for heightwise movement; means for initially maintaining the support in a lower position wherein the insole heel seat is below and spaced from the hold-down; means for initially maintaining the toe rest in a lower position; means for raising the support to raise the shoe assembly and bring the insole heel seat into engagement with the hold-down at a level suitable for wiping and to clamp the shoe assembly between the support and the hold-down with the vamp of the shoe assembly rising upwardly of the toe rest during the rise of the shoe assembly; and control means, operative thereafter, for raising the toe rest under a yieldable force into engagement with said vamp.

20. A machine as defined in claim 19 further comprising: means responsive to said engagement of the toe rest with said vamp to lock the toe rest against movement.

21. A machine as defined in claim 19 further comprising: a platform mounted for heightwise movement; means mounting the support to the platform to thereby mount the support for heightwise movement, said raising of the support being effected by the raising of the platform from an initial lower position; a column extending upwardly of the platform forwardly of the support and mounted to the platform for heightwise movement with the platform; means mounting the toe rest to the column for heightwise movement; means for initially maintaining the toe rest in a lower position with respect to the column to thereby maintain the toe rest in said lower position; and control means, operative subsequent to said clamping of the shoe assembly, to raise the toe rest with respect to the column under said yieldable force.

22. A machine as defined in claim 21 further comprising: means responsive to said engagement of the toe rest with said vamp to lock the toe rest against movement with respect to said column.

23. A machine as defined in claim 22 further comprising: a bar; means mounting the toe rest to the bar so as to yieldably urge the toe rest upwardly of the bar; means mounting the bar to the column for heightwise movement to thereby effect said mounting of the toe rest to the column for heightwise movement; a brake mounted to the column for movement towards and away from the bar; means for initially urging the brake away from the bar; and means responsive to the downward movement of the toe rest with respect to the bar, pursuant to said engagement of the toe rest with the vamp, to cause the brake to move against the bar and thereby effect said locking of the toe rest against movement with respect to the column.

References Cited
UNITED STATES PATENTS

| | | | |
|---|---|---|---|
| 3,386,114 | 6/1968 | Barton et al. | 12—12.5 |
| 3,409,921 | 11/1968 | Stein et al. | 12—12.5 |
| 3,039,121 | 6/1962 | Weinschenk | 12—10.1 |
| 3,251,081 | 5/1966 | Springer | 12—10.1 |

PATRICK D. LAWSON, Primary Examiner